(12) United States Patent
Luomi et al.

(10) Patent No.: US 11,916,630 B2
(45) Date of Patent: Feb. 27, 2024

(54) METHOD AND APPARATUS FOR ACCELERATING ESTIMATION OF A RADIO MODEL OF A BEAMFORMING ACCESS POINT

(71) Applicant: HERE Global B.V., Eindhoven (NL)

(72) Inventors: Marko Luomi, Lempäälä (FI); Petri Rauhala, Tampere (FI); Lauri Aarne Johannes Wirola, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 69 days.

(21) Appl. No.: 17/316,840

(22) Filed: May 11, 2021

(65) Prior Publication Data

US 2022/0368392 A1     Nov. 17, 2022

(51) Int. Cl.
| | |
|---|---|
| *H04B 7/06* | (2006.01) |
| *H04B 17/318* | (2015.01) |
| *H04W 16/28* | (2009.01) |
| *H04W 24/10* | (2009.01) |

(52) U.S. Cl.
CPC ......... *H04B 7/0617* (2013.01); *H04B 17/318* (2015.01); *H04W 16/28* (2013.01); *H04W 24/10* (2013.01)

(58) Field of Classification Search
CPC ... H04B 7/0617; H04B 17/318; H04W 16/28; H04W 24/10
See application file for complete search history.

(56) References Cited

U.S. PATENT DOCUMENTS

| | | | |
|---|---|---|---|
| 8,126,476 B2 | 2/2012 | Vardi et al. | |
| 10,700,757 B2 | 6/2020 | Singh et al. | |
| 2005/0245252 A1* | 11/2005 | Kappes | H04W 16/18 455/446 |

(Continued)

FOREIGN PATENT DOCUMENTS

| | | |
|---|---|---|
| CN | 110418285 A | 11/2019 |
| WO | WO 2009/144030 A2 | 12/2009 |
| WO | WO 2021/006796 A1 | 1/2021 |

OTHER PUBLICATIONS

Huang et al., "On the Crowdsourcing-Based Radio Map Construction with Noisy Location Labels", IEEE 2018 Chinese Control and Decision Conference (CCDC), (Jun. 9-11, 2018), 5 pages.

(Continued)

*Primary Examiner* — Jae Y Lee
*Assistant Examiner* — Aixa A Guadalupe Cruz

(57) ABSTRACT

A method, apparatus and computer program product are provided to accelerate the estimation of a radio model of a beamforming access point within a radio environment, such as a beamforming access point that has been newly added to or relocated. In a method, the presence of a first beamforming access point in a radio environment is determined and information is obtained regarding one or more of a plurality of beams that are transmitted by the first access point. The method then estimates the radio model of the first access point based at least upon: (i) at least some of the information regarding the one or more of the beams transmitted by the first access point and (ii) signal propagation characteristics of one or more existing access points in the radio environment as represented by respective radio models of the one or more existing access points.

20 Claims, 8 Drawing Sheets

(56) References Cited

U.S. PATENT DOCUMENTS

| | | | |
|---|---|---|---|
| 2015/0312877 A1* | 10/2015 | Bhanage | H04W 4/029 455/456.5 |
| 2017/0343639 A1* | 11/2017 | Ivanov | G01S 5/02524 |
| 2019/0130019 A1 | 5/2019 | De et al. | |
| 2019/0181935 A1* | 6/2019 | Karjalainen | H04B 7/0617 |
| 2019/0306662 A1 | 10/2019 | Poola et al. | |
| 2020/0008168 A1* | 1/2020 | Mudulodu | G01S 5/0252 |
| 2021/0044339 A1 | 2/2021 | Zhang et al. | |

OTHER PUBLICATIONS

U.S. Appl. No. 17/082,887, "Method and Apparatus for Accelerating Estimation of a Radio Model of an Access Point", Unpublished, filed Oct. 28, 2020, (Luomi et al., Inventor) (HERE Global B.V., assignee), 42 pages.

U.S. Appl. No. 17/116,798, "Method and Apparatus for Restricting Use of a Beamforming Node for Positioning Purposes", Unpublished, filed Dec. 29, 2020, (Luomi et al., Inventor) (HERE Global B.V., assignee), 36 pages.

Extended European Search Report for European Application No. 22172691.2 dated Oct. 4, 2022, 7 pages.

\* cited by examiner

METHOD AND APPARATUS FOR ACCELERATING ESTIMATION OF A RADIO MODEL OF A BEAMFORMING ACCESS POINT

TECHNOLOGICAL FIELD

A method, apparatus and computer program product are provided in accordance with an example embodiment in order to estimate the radio model of a beamforming access point and, more particularly, to accelerate the estimation of the radio model of a beamforming access point, e.g., a newly deployed beamforming access point, based upon respective radio models of one or more existing access points within the same radio environment.

BACKGROUND

Various positioning systems have been developed for determining the position of a mobile device, such as a smart phone or other types of user equipment. At least some of these positioning systems utilize radio models of wireless access points that, in turn, are based on probe points that have been collected by a plurality of mobile devices. The wireless access points may be part of a cellular system, such as a Global System for Mobile communications (GSM) system, a wideband code division multiple access (WCDMA) system, a time division synchronous code division system multiple access (TD-SCDMA) system, a Long Term Evolution (LTE) system, a Long Term Evolution Advanced (LTE-A) system, a code division multiple access (CDMA) system, a NarrowBand-Internet of Things (NB-IoT) system, etc. or a non-cellular system, such as a Wireless Local Area Network (WLAN) system, a Bluetooth (BT) system, a Bluetooth Low Energy (BTLE) system, a Zigbee system or a long range (LoRa) system.

In relation to the radio models of wireless access points that are utilized by positioning systems, databases containing information regarding the radio signals received by mobile devices at different locations relative to the access points are created. The databases are typically formed of data provided by the mobile devices in the form of probe points that serve as radio fingerprints. Each probe point includes an estimate of the location of the mobile device at the time at which the radio signals were captured and a measurement of the radio signals that were captured. With respect to cellular signals, the measurement of the cellular signals may include an identification of the access point, that is, the cellular network cell, e.g., base station, that is transmitting the cellular signals that are received by the mobile device, such as a global and/or local identifier (ID) of the cellular network cell. The measurement of the cellular signals may also include a measurement of the signal strength and/or an estimate of the path loss as well as a timing measurement, such as a Timing Advance measurement or a Round-Trip Time measurement. With respect to the measurement of a non-cellular signal, the measurement may include an identification of the access point generating the non-cellular signals that are received by the mobile device, such as the basic service set identifiers (BSSIDs), e.g., a media access control (MAC) address of the air interface of an access point, e.g., a WLAN access point, or the service set identifier (SSID) or network name of the access point, e.g., WLAN access point. The measurement of a non-cellular signal also includes a measure of the signal strength, such as the received signal strength, the Rx level, etc. and/or a path loss estimate. In some embodiments, the measurement of a non-cellular signal also includes a timing measurement, such as the Round-Trip Time measurement.

The data, such as the probe points, collected by the plurality of mobile devices is generally uploaded, such as to a server or the cloud. By reference to the data, the positioning system then generates or updates radio models of the wireless access points that define the signal characteristics of radio signals that are transmitted by the wireless access points and received by mobile devices at different respective locations. The radio model may then be utilized for positioning purposes, that is, to determine the location of a mobile device based upon radio signals received by the mobile device at the respective location. Various radio models may be constructed including radio models based upon the coverage areas of the access points, radio models based upon the positions of the access points, radio propagation models, radio models based upon the Rx fields of the access points or the like. The resulting radio models may be stored by one or more network entities, such as by the positioning system, and/or may be transferred to one or more of the mobile devices.

The radio models may then be utilized to determine the position of a mobile device. For example, while a mobile device is at an unknown location, the mobile device may capture measurements of the cellular or non-cellular signals transmitted by the access points. By reference to the radio models that have been constructed, the measurements of the radio signals may be evaluated and the location of the mobile terminal may be determined, such as based upon the coverage areas of the access points.

Traditionally, the cellular network cells, such as the base stations of a cellular network and the access points of a non-cellular network have a fixed coverage model. As shown in FIG. 1, a fixed coverage model of a wireless communication node, such as a cellular network cell or a non-cellular access point, has a transmission power level distribution that is stable and static. In this regard, FIG. 1 depicts a wireless communication node 10 having a signal antenna element transmitting in a fixed direction. Since the transmission power level distribution is stable, the resulting coverage model 12 of the wireless communication node is depicted to be relatively static with the measured transmission power level around the wireless communication node not varying over time.

However, some radio technologies, such as fifth generation (5G) cellular networks and 802.11ac non-cellular networks, support beamforming. Beamforming is a technique that utilizes an array of antennas, such as phase-controlled antennas, that are controlled to individually transmit radio signals in a respective direction. Rather than transmitting radio signals in all directions, a beamforming node is configured to initially determine a direction of interest, such as the direction of a mobile device relative to the beamforming node, and then to control the array of antennas so as to send and receive a stronger beam of radio signals in the direction of interest than in other directions. Alternatively, a beamforming node may sequentially transmit radio signals by each of the antennas of the phased array, thereby employing beam sweeping such that radio signals are preferentially transmitted and received in different directions in a predefined sequence. As the direction in which a stronger beam of radio signals is transmitted and received may vary over time, the resulting coverage model of the beamforming node is dynamic. In other words, at different times, the power level of the radio signals transmitted by a beamforming node that are received and measured at a particular location relative to the beamforming node can vary significantly.

By way of example, FIG. 2A depicts the coverage model 14 of a beamforming node 16 at one point in time, while FIG. 2B depicts the coverage model of the same beamforming node at a different point in time. As illustrated, the coverage models of the same beamforming node differ with the radio signals being preferentially transmitted and received by different antennas of the phased array at different points in time.

The dynamic nature of the coverage model of a beamforming node creates challenges with respect to the generation of a radio model that is based upon radio fingerprints collected by mobile devices at different points in time based upon the radio signals transmitted by the beamforming node. In this regard, the radio fingerprints collected by a mobile device at the same location relative to a beamforming mode may be different at different points in time because of the changes in the coverage model of the beamforming node. Thus, the accuracy and reliability of the resulting radio model may be reduced in instances in which the wireless communication nodes include one or more beamforming nodes due to the changing nature of the coverage model of a beamforming node. Similarly, the location of a beamforming node that is estimated based on the radio fingerprints including the signal strength values of the radio signals transmitted by the beamforming node may also be less accurate due to the dynamic nature of the coverage model relative to a wireless communication node having a static coverage model.

Additionally, at least some radio environments change over time as access points are added, moved, e.g., relocated, or removed. In a non-cellular environment, for example, it may not be uncommon for access points, such as WLAN access points, to be added or removed from the radio environment. These changes in the radio environment brought about by the addition, movement or removal of an access point alter the resulting radio models that are present within the radio environment. For example, the addition of an access point adds a further radio model to the radio environment and the movement of an access point changes an existing radio model within the radio environment. In order to ensure that the radio models can be utilized in an accurate manner, such as to determine the position of a mobile terminal within the radio environment, the radio models must be redefined or updated as access points are added, moved or removed within the radio environment since the radio model database otherwise becomes out of date.

The creation of a new radio model for an access point that is added to a radio environment or the updating of a radio model for an access point that is moved within the radio environment may take some time in order to accumulate sufficient probe points from the respective access points such that the radio model can be accurately defined or updated. This delay in creating a new radio model or updating a radio model may be particularly substantial in an instance in which the access point that is added or moved is a beamforming access point for which the coverage model changes over time. While the radio model for the access point that has been added or moved is being defined or updated, the radio models that are utilized to determine the position of a mobile terminal may be outdated, such as in an instance in which an access point has moved or been relocated, or incomplete, such as in an instance in which an access point has been added to the radio environment. In any event, the utilization of the radio models of the access points within the radio environment may not yield results that are as accurate as may be desired in an instance in which a radio model is being newly defined or updated, thereby potentially leading to a reduction in confidence in the resulting positions determinations.

BRIEF SUMMARY

A method, apparatus and computer program product are provided in accordance with an example embodiment in order to accelerate the estimation of the radio model of a beamforming access point within a radio environment, such as a beamforming access point that has been newly added to the radio environment or a beamforming access point that is been moved or relocated within the radio environment. By utilizing the radio models of other access points within the radio environment for purposes of estimating the radio model of the beamforming access point that has been newly added to or has been relocated within the radio environment, the radio model that is estimated in accordance with an example embodiment may not only be more quickly defined, but may be defined with enhanced accuracy relative to radio models that are defined on the basis of only a few probe points. Thus, the radio model that is estimated by the method, apparatus and computer program product of an example embodiment may be utilized to reliably determine the position of a mobile terminal within the radio environment.

In an example embodiment, a method is provided for accelerating estimation of a radio model of a first access point. The method includes determining a presence of the first access point in a radio environment. The method also includes determining that the first access point is a beamforming node and obtaining information regarding one or more of a plurality of beams. The plurality of beams are transmitted by the first access point. The method further includes estimating the radio model of the first access point based at least upon: (i) at least some of the information regarding the one or more of the beams transmitted by the first access point and (ii) signal propagation characteristics of one or more existing access points in the radio environment as represented by respective radio models of the one or more existing access points.

The method of an example embodiment determines the presence of the first access point by determining the presence of the first access point based at least upon a first probe point representative of radio signals transmitted by a respective beam from among the plurality of beams transmitted by the first access point. In this example embodiment, the method obtains information regarding the one or more of the plurality of beams transmitted by the first access point by obtaining information regarding a total number of beams and an identification of the respective beam of the first access point providing the radio signals of which the first probe point is representative.

The method may also estimate the radio model of the first access point by orienting the radio model of the first access point based at least in part upon the identification of the respective beam of the first access point in relation to the total number of beams of the first access point. Additionally or alternatively, the method may also include receiving information regarding a second probe point representative of radio signals transmitted by another beam of the plurality of beams transmitted by the first access point. In this example embodiment, the method estimates the radio model of the first access point by orienting the radio model of the first access point based at least in part upon relative positions of the respective beam and the another beam in relation to the total number of beams of the first access point. The method may also include receiving information regarding a second probe point representative of the radio signals transmitted in the respective beam of the first access point. In this example embodiment, the first and second probe points are associated with different respective locations and provide information regarding a signal strength of the radio signals transmitted in the respective beam of the first access point and received at the respective location. Additionally, the method of this example embodiment estimates the radio model of the first access point by estimating the radio model of the first access point based at least in part upon the signal strength of the radio signals represented by the first probe point and the signal strength of the radio signals represented by the second probe point.

The method of an example embodiment estimates the radio model of the first access point by estimating the radio model of the first access point based upon at least one of a size or shape of the respective radio models of the one or more existing access points. In an example embodiment, the method estimates the radio model of the first access point by estimating the radio model of the first access point based upon at least a shape of the respective radio models of the one or more existing access points relative to an obstacle within the radio environment. In this example embodiment, the obstacle includes an obstacle to signal propagation within the radio environment. The method of an example embodiment determines that the first access point is a beamforming node by detecting that the first access point employs beam sweeping to alter signal strengths of the plurality of beams transmitted by the first access point over time.

In another example embodiment, an apparatus is provided that is configured to accelerate estimation of a radio model of a first access point. The apparatus includes processing circuitry and at least one memory including computer program code instructions with the computer program code instructions configured to, when executed by the processing circuitry, cause the apparatus to determine a presence of the first access point in a radio environment. The computer program code instructions are also configured to, when executed by the processing circuitry, cause the apparatus to determine that the first access point is a beamforming node and to obtain information regarding one or more of a plurality of beams. The plurality of beams are transmitted by the first access point. The computer program code instructions are further configured to, when executed by the processing circuitry, cause the apparatus to estimate the radio model of the first access point based at least upon: (i) at least some of the information regarding the one or more of the beams transmitted by the first access point and (ii) signal propagation characteristics of one or more existing access points in the radio environment as represented by respective radio models of the one or more existing access points.

The computer program code instructions are configured to, when executed by the processing circuitry, cause the apparatus of an example embodiment to determine the presence of the first access point by determining the presence of the first access point based at least upon a first probe point representative of radio signals transmitted by a respective beam of the plurality of beams transmitted by the first access point. In this example embodiment, the computer program code instructions are also configured to, when executed by the processing circuitry, cause the apparatus to obtain information regarding the one or more of the plurality of beams transmitted by the first access point by obtaining information regarding a total number of beams and an identification of the respective beam of the first access point providing the radio signals of which the first probe point is representative.

The computer program code instructions are configured to, when executed by the processing circuitry, cause the apparatus of an example embodiment to estimate the radio model of the first access point by orienting the radio model of the first access point based at least in part upon the identification of the respective beam of the first access point in relation to the total number of beams of the first access point. Additionally or alternatively, the computer program code instructions are further configured to, when executed by the processing circuitry, cause the apparatus to receive information regarding a second probe point representative of radio signals transmitted by another beam of the plurality of beams transmitted by the first access point. In this example embodiment, the computer program code instructions are also configured to, when executed by the processing circuitry, cause the apparatus to estimate the radio model of the first access point by orienting the radio model of the first access point based at least in part upon relative positions of the respective beam and the another beam in relation to the total number of beams of the first access point.

The computer program code instructions are further configured to, when executed by the processing circuitry, cause the apparatus of an example embodiment to receive information regarding a second probe point representative of the radio signals transmitted in the respective beam of the first access point. The first and second probe points are associated with different respective locations and provide information regarding a signal strength of the radio signals transmitted in the respective beam of the first access point and received at the respective location. In this example embodiment, the computer program code instructions are configured to, when executed by the processing circuitry, cause the apparatus to estimate the radio model of the first access point by estimating the radio model of the first access point based at least in part upon the signal strength of the radio signals represented by the first probe point and the signal strength of the radio signals represented by the second probe point.

The computer program code instructions are configured to, when executed by the processing circuitry, cause the apparatus of an example embodiment to estimate the radio model of the first access point by estimating the radio model of the first access point based upon at least one of a size or shape of the respective radio models of the one or more existing access points. In an example embodiment, the computer program code instructions are configured to, when executed by the processing circuitry, cause the apparatus to estimate the radio model of the first access point by estimating the radio model of the first access point based upon at least a shape of the respective radio models of the one or more existing access points relative to an obstacle within the radio environment. In this example embodiment, the obstacle comprises an obstacle to signal propagation within the radio environment.

In a further example embodiment, a computer program product is provided for accelerating estimation of a radio model of a first access point. The computer program product includes at least one non-transitory computer-readable storage medium having computer-executable program code instructions stored therein with the computer-executable program code instructions including program code instructions configured to determine a presence of the first access point in a radio environment. The computer-executable program code instructions also include program code instructions configured to determine that the first access point is a beamforming node and to obtain information regarding one or more of a plurality of beams. The plurality of beams are transmitted by the first access point. The computer-executable program code instructions further include program code instructions configured to estimate the radio model of the first access point based at least upon: (i) at least some of the information regarding the one or more of the beams transmitted by the first access point and (ii) signal propagation characteristics of one or more existing access points in the radio environment as represented by respective radio models of the one or more existing access points.

The program code instructions of an example embodiment that are configured to determine the presence of the first access point include program code instructions configured to determine the presence of the first access point based at least upon a first probe point representative of radio signals transmitted by a respective beam from among the plurality of beams transmitted by the first access point. In this example embodiment, the program code instructions configured to obtain information regarding the one or more of the plurality of beams transmitted by the first access point include program code instructions configured to obtain information regarding a total number of beams and an identification of the respective beam of the first access point providing the radio signals of which the first probe point is representative.

The program code instructions of an example embodiment that are configured to estimate the radio model of the first access point include program code instructions configured to orient the radio model of the first access point based at least in part upon the identification of the respective beam of the first access point in relation to the total number of beams of the first access point. Additionally or alternatively, the computer-executable program code instructions may also include program code instructions configured to receive information regarding a second probe point representative of radio signals transmitted by another beam of the plurality of beams transmitted by the first access point. In this example embodiment, the program code instructions configured to estimate the radio model of the first access point include program code instructions configured to orient the radio model of the first access point based at least in part upon relative positions of the respective beam and the another beam in relation to the total number of beams of the first access point. The computer-executable program code instructions may also include program code instructions configured to receive information regarding a second probe point representative of the radio signals transmitted in the respective beam of the first access point. In this example embodiment, the first and second probe points are associated with different respective locations and provide information regarding a signal strength of the radio signals transmitted in the respective beam of the first access point and received at the respective location. Additionally, the program code instructions of this example embodiment that are configured to estimate the radio model of the first access point include program code instructions configured to estimate the radio model of the first access point based at least in part upon the signal strength of the radio signals represented by the first probe point and the signal strength of the radio signals represented by the second probe point.

The program code instructions of an example embodiment that are configured to estimate the radio model of the first access point include program code instructions configured to estimate the radio model of the first access point based upon at least one of a size or shape of the respective radio models of the one or more existing access points. In an example embodiment, the program code instructions configured to estimate the radio model of the first access point include program code instructions configured to estimate the radio model of the first access point based upon at least a shape of the respective radio models of the one or more existing access points relative to an obstacle within the radio environment. In this example embodiment, the obstacle includes an obstacle to signal propagation within the radio environment. The program code instructions of an example embodiment that are configured to determine that the first access point is a beamforming node include program code instructions configured to detect that the first access point employs beam sweeping to alter signal strengths of the plurality of beams transmitted by the first access point over time.

In yet another example embodiment, an apparatus is provided for accelerating estimation of a radio model of a first access point. The apparatus includes means for determining a presence of the first access point in a radio environment. The apparatus also includes means for determining that the first access point is a beamforming node and means for obtaining information regarding one or more of a plurality of beams. The plurality of beams are transmitted by the first access point. The apparatus further includes means for estimating the radio model of the first access point based at least upon: (i) at least some of the information regarding the one or more of the beams transmitted by the first access point and (ii) signal propagation characteristics of one or more existing access points in the radio environment as represented by respective radio models of the one or more existing access points.

The means for determining the presence of the first access point in accordance with an example embodiment includes means for determining the presence of the first access point based at least upon a first probe point representative of radio signals transmitted by a respective beam from among the plurality of beams transmitted by the first access point. In this example embodiment, the means for obtaining information regarding the one or more of the plurality of beams transmitted by the first access point includes means for obtaining information regarding a total number of beams and an identification of the respective beam of the first access point providing the radio signals of which the first probe point is representative.

The means for estimating the radio model of the first access point in accordance with an example embodiment includes means for orienting the radio model of the first access point based at least in part upon the identification of the respective beam of the first access point in relation to the total number of beams of the first access point. Additionally or alternatively, the apparatus may also include means for receiving information regarding a second probe point representative of radio signals transmitted by another beam of the plurality of beams transmitted by the first access point. In this example embodiment, the means for estimating the radio model of the first access point includes means for orienting the radio model of the first access point based at least in part upon relative positions of the respective beam and the another beam in relation to the total number of beams of the first access point. The apparatus may also include means for receiving information regarding a second probe point representative of the radio signals transmitted in the respective beam of the first access point. In this example embodiment, the first and second probe points are associated with different respective locations and provide information regarding a signal strength of the radio signals transmitted in the respective beam of the first access point and received at the respective location. Additionally, the means for estimating the radio model of the first access point in accordance with this example embodiment includes means for estimating the radio model of the first access point based at least in part upon the signal strength of the radio signals represented by the first probe point and the signal strength of the radio signals represented by the second probe point.

The means for estimating the radio model of the first access point includes means for estimating the radio model of the first access point based upon at least one of a size or shape of the respective radio models of the one or more existing access points. In an example embodiment, the means for estimating the radio model of the first access point includes means for estimating the radio model of the first access point based upon at least a shape of the respective radio models of the one or more existing access points relative to an obstacle within the radio environment. In this example embodiment, the obstacle includes an obstacle to signal propagation within the radio environment. The means for determining that the first access point is a beamforming node in an example embodiment includes means for detecting that the first access point employs beam sweeping to alter signal strengths of the plurality of beams transmitted by the first access point over time.

In an example embodiment, a method is provided for accelerating estimation of a radio model of a beamforming access point. Following estimation of respective radio models of one or more existing access points within a radio environment, the method includes detecting that the beamforming access point has been added to or has been relocated within the radio environment. The method also includes obtaining information regarding one or more of a plurality of beams that have been transmitted by the beamforming access point. The method further includes estimating the radio model of the beamforming access point based at least upon: (i) at least some of the information regarding one or more of the beams transmitted by the beamforming access point and (ii) signal propagation characteristics of the one or more existing access points in the radio environment.

The method of an example embodiment detects that the beamforming access point has been added to or has been relocated within the radio environment in a manner that is based at least upon a first probe point representative of radio signals transmitted by a respective beam of the plurality of beams transmitted by the beamforming access point. In this example embodiment, the method obtains information regarding the one or more of the plurality of beams transmitted by the beamforming access point by obtaining information regarding a total number of beams and an identification of the respective beam of the beamforming access point providing the radio signals of which the first probe point is representative.

The method of an example embodiment estimates the radio model of the beamforming access point by orienting the radio model of the beamforming access point based at least in part upon the identification of the respective beam of the beamforming access point in relation to the total number of beams of the beamforming access point. In an example embodiment, the method also includes receiving information regarding a second probe point representative of radio signals transmitted by another beam of the plurality of beams transmitted by the beamforming access point. In this example embodiment, the method estimates the radio model of the beamforming access point by orienting the radio model of the beamforming access point based at least in part upon relative positions of the first and second probe points in relation to the total number of beams of the beamforming access point.

The method of an example embodiment also includes receiving information regarding a second probe point representative of the radio signals transmitted in the respective beam of the beamforming access point. In this example embodiment, the first and second probe points are associated with different respective locations and provide information regarding a signal strength of the radio signals transmitted in the respective beam of the beamforming access point and received at the respective location. The method of this example embodiment estimates the radio model of the beamforming access point by estimating the radio model of the beamforming access point based at least in part upon the signal strength of the radio signals represented by the first probe point and the signal strength of the radio signals represented by the second probe point.

In another example embodiment, an apparatus is provided that is configured to accelerate estimation of a radio model of a beamforming access point. The apparatus includes processing circuitry and at least one memory including computer program code instructions with the computer program code instructions configured to, when executed by the processing circuitry, cause the apparatus to detect, following estimation of respective radio models of one or more existing access points within a radio environment, that the beamforming access point has been added to or has been relocated within the radio environment. The computer program code instructions are also configured to, when executed by the processing circuitry, cause the apparatus to obtain information regarding one or more of a plurality of beams that have been transmitted by the beamforming access point. The computer program code instructions are further configured to, when executed by the processing circuitry, cause the apparatus to estimate the radio model of the beamforming access point based at least upon: (i) at least some of the information regarding one or more of the beams transmitted by the beamforming access point and (ii) signal propagation characteristics of the one or more existing access points in the radio environment.

The computer program code instructions are configured to, when executed by the processing circuitry, cause the apparatus of an example embodiment to detect that the beamforming access point has been added to or has been relocated within the radio environment in a manner that is based at least upon a first probe point representative of radio signals transmitted by a respective beam of the plurality of beams transmitted by the beamforming access point. In this example embodiment, the computer program code instructions are configured to, when executed by the processing circuitry, cause the apparatus to obtain information regarding the one or more of the plurality of beams transmitted by the beamforming access point by obtaining information regarding a total number of beams and an identification of the respective beam of the beamforming access point providing the radio signals of which the first probe point is representative.

The computer program code instructions are configured to, when executed by the processing circuitry, cause the apparatus of an example embodiment to estimate the radio model of the beamforming access point by orienting the radio model of the beamforming access point based at least in part upon the identification of the respective beam of the beamforming access point in relation to the total number of beams of the beamforming access point. In an example embodiment, the computer program code instructions are further configured to, when executed by the processing circuitry, cause the apparatus to receive information regarding a second probe point representative of radio signals transmitted by another beam of the plurality of beams transmitted by the beamforming access point. In this example embodiment, the computer program code instructions are configured to, when executed by the processing circuitry, cause the apparatus to estimate the radio model of the beamforming access point by orienting the radio model of the beamforming access point based at least in part upon relative positions of the first and second probe points in relation to the total number of beams of the beamforming access point.

The computer program code instructions are also configured to, when executed by the processing circuitry, cause the apparatus an example embodiment to receive information regarding a second probe point representative of the radio signals transmitted in the respective beam of the beamforming access point. In this example embodiment, the first and second probe points are associated with different respective locations and provide information regarding a signal strength of the radio signals transmitted in the respective beam of the beamforming access point and received at the respective location. The computer program code instructions are configured to, when executed by the processing circuitry, cause the apparatus of this example embodiment to estimate the radio model of the beamforming access point by estimating the radio model of the beamforming access point based at least in part upon the signal strength of the radio signals represented by the first probe point and the signal strength of the radio signals represented by the second probe point.

In a further example embodiment, a computer program product is provided for accelerating estimation of a radio model of a beamforming access point. The computer program product includes at least one non-transitory computer-readable storage medium having computer-executable program code instructions stored therein with the computer-executable program code instructions including program code instructions configured to detect, following estimation of respective radio models of one or more existing access points within a radio environment, that the beamforming access point has been added to or has been relocated within the radio environment. The computer-executable program code instructions also include program code instructions configured to obtain information regarding one or more of a plurality of beams that have been transmitted by the beamforming access point. The computer-executable program code instructions further include program code instructions configured to estimate the radio model of the beamforming access point based at least upon: (i) at least some of the information regarding one or more of the beams transmitted by the beamforming access point and (ii) signal propagation characteristics of the one or more existing access points in the radio environment.

The program code instructions of an example embodiment are configured to detect that the beamforming access point has been added to or has been relocated within the radio environment in a manner that is based at least upon a first probe point representative of radio signals transmitted by a respective beam of the plurality of beams transmitted by the beamforming access point. In this example embodiment, the program code instructions configured to obtain information regarding the one or more of the plurality of beams transmitted by the beamforming access point include program code instructions configured to obtain information regarding a total number of beams and an identification of the respective beam of the beamforming access point providing the radio signals of which the first probe point is representative.

The program code instructions of an example embodiment that are configured to estimate the radio model of the beamforming access point include program code instructions configured to orient the radio model of the beamforming access point based at least in part upon the identification of the respective beam of the beamforming access point in relation to the total number of beams of the beamforming access point. In an example embodiment, the computer-executable program code instructions also include program code instructions configured to receive information regarding a second probe point representative of radio signals transmitted by another beam of the plurality of beams transmitted by the beamforming access point. In this example embodiment, the program code instructions configured to estimate the radio model of the beamforming access point include program code instructions configured to orient the radio model of the beamforming access point based at least in part upon relative positions of the first and second probe points in relation to the total number of beams of the beamforming access point.

The computer-executable program code instructions of an example embodiment also include program code instructions configured to receive information regarding a second probe point representative of the radio signals transmitted in the respective beam of the beamforming access point. In this example embodiment, the first and second probe points are associated with different respective locations and provide information regarding a signal strength of the radio signals transmitted in the respective beam of the beamforming access point and received at the respective location. The program code instructions of this example embodiment that are configured to estimate the radio model of the beamforming access point include program code instructions configured to estimate the radio model of the beamforming access point based at least in part upon the signal strength of the radio signals represented by the first probe point and the signal strength of the radio signals represented by the second probe point.

In yet another example embodiment, an apparatus is provided for accelerating estimation of a radio model of a beamforming access point. The apparatus includes means for detecting, following estimation of respective radio models of one or more existing access points within a radio environment, that the beamforming access point has been added to or has been relocated within the radio environment. The apparatus also includes means for obtaining information regarding one or more of a plurality of beams that have been transmitted by the beamforming access point. The apparatus further includes means for estimating the radio model of the beamforming access point based at least upon: (i) at least some of the information regarding one or more of the beams transmitted by the beamforming access point and (ii) signal propagation characteristics of the one or more existing access points in the radio environment.

The means of an example embodiment for detecting that the beamforming access point has been added to or has been relocated within the radio environment does so in a manner that is based at least upon a first probe point representative of radio signals transmitted by a respective beam of the plurality of beams transmitted by the beamforming access point. In this example embodiment, the means for obtaining information regarding the one or more of the plurality of beams transmitted by the beamforming access point includes means for obtaining information regarding a total number of beams and an identification of the respective beam of the beamforming access point providing the radio signals of which the first probe point is representative.

The means of an example embodiment for estimating the radio model of the beamforming access point includes means for orienting the radio model of the beamforming access point based at least in part upon the identification of the respective beam of the beamforming access point in relation to the total number of beams of the beamforming access point. In an example embodiment, the apparatus also includes means for receiving information regarding a second probe point representative of radio signals transmitted by another beam of the plurality of beams transmitted by the beamforming access point. In this example embodiment, the means for estimating the radio model of the beamforming access point includes means for orienting the radio model of the beamforming access point based at least in part upon relative positions of the first and second probe points in relation to the total number of beams of the beamforming access point.

The apparatus of an example embodiment also includes means for receiving information regarding a second probe point representative of the radio signals transmitted in the respective beam of the beamforming access point. In this example embodiment, the first and second probe points are associated with different respective locations and provide information regarding a signal strength of the radio signals transmitted in the respective beam of the beamforming access point and received at the respective location. In this example embodiment, the means for estimating the radio model of the beamforming access point may include means for estimating the radio model of the beamforming access point based at least in part upon the signal strength of the radio signals represented by the first probe point and the signal strength of the radio signals represented by the second probe point.

BRIEF DESCRIPTION OF THE DRAWINGS

Figure 1:
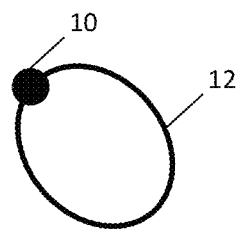
Figure 2A:
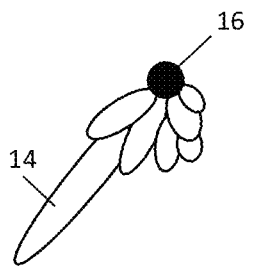
Figure 2B:
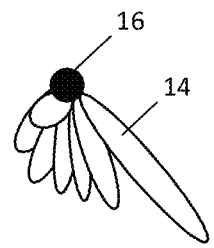
Figure 3A:
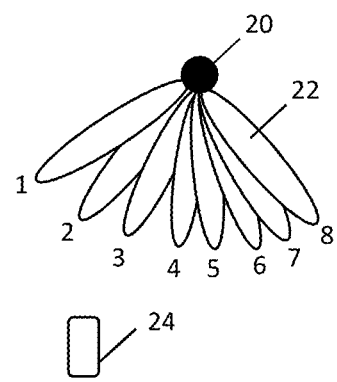
Figure 3B:
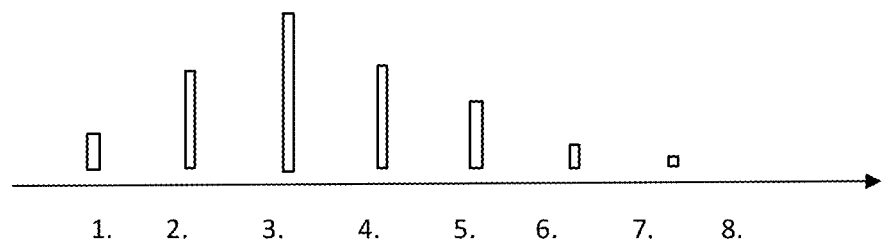
Figure 4:
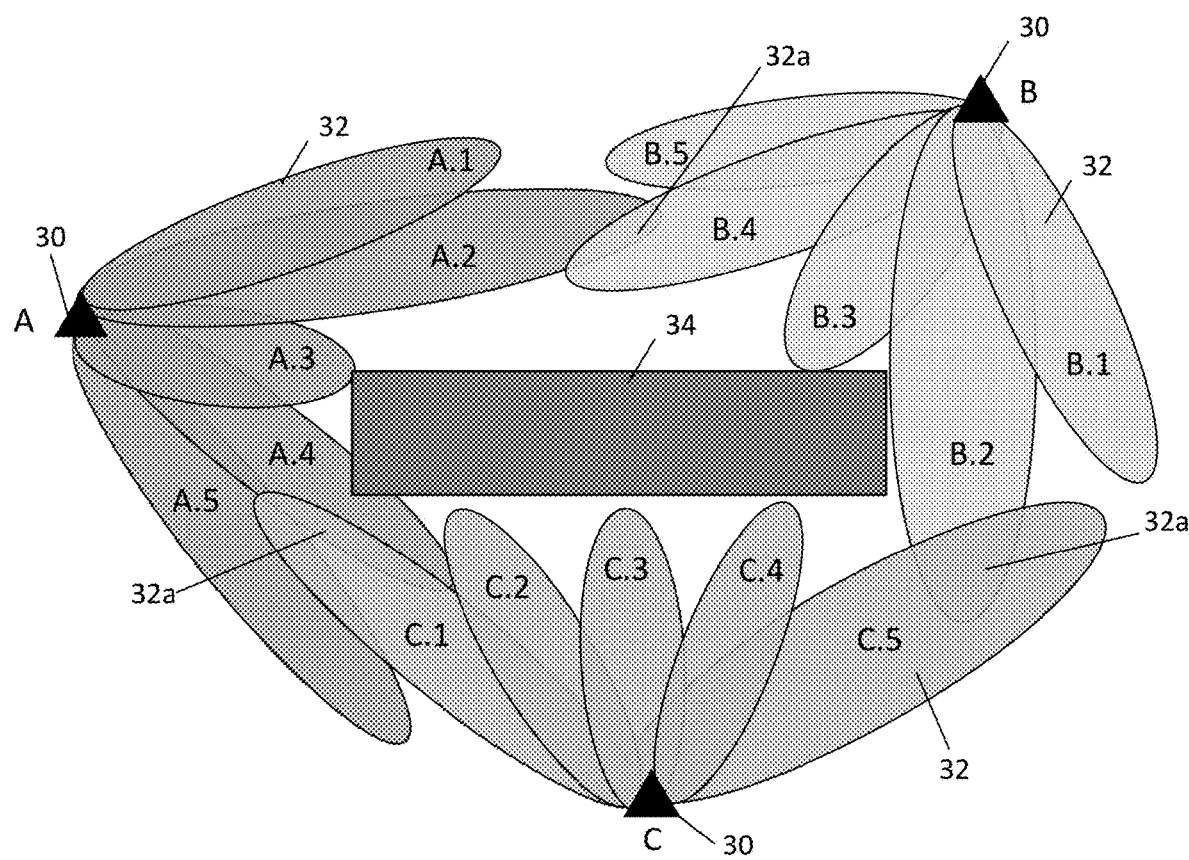
Figure 5:
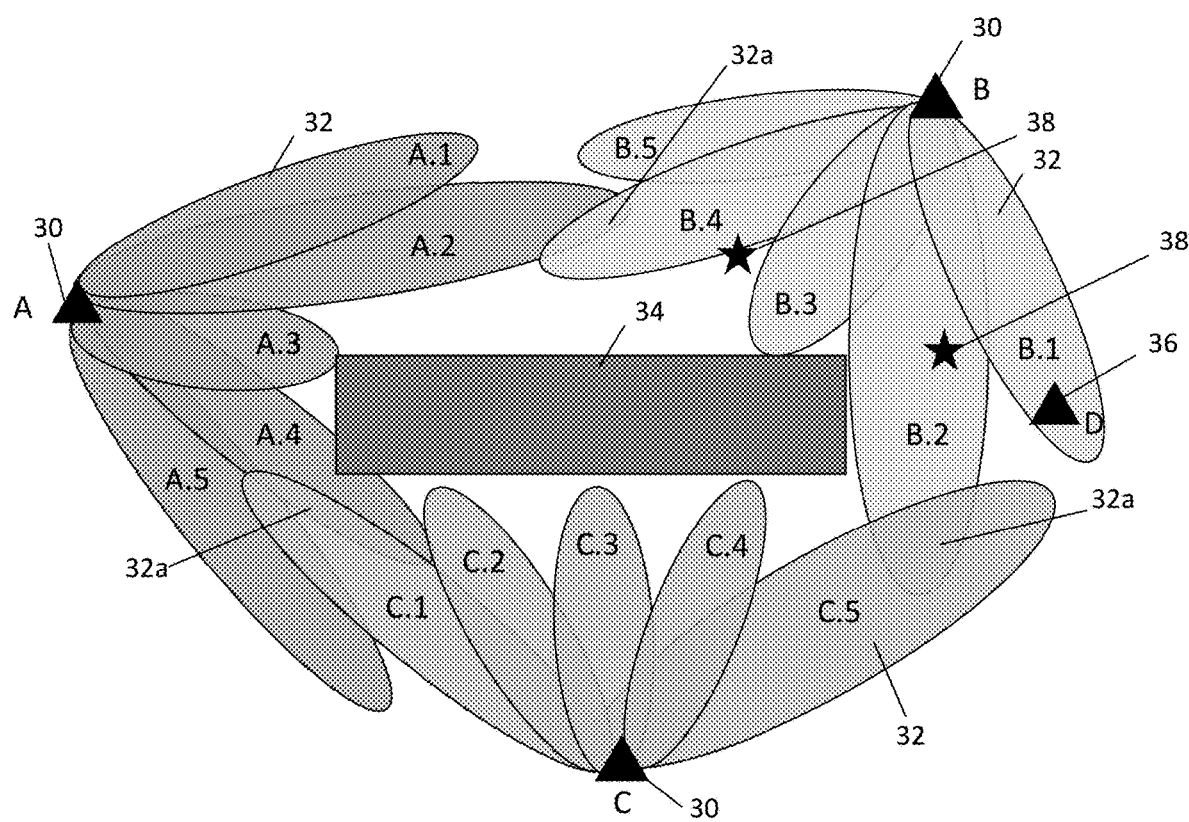
Figure 6:
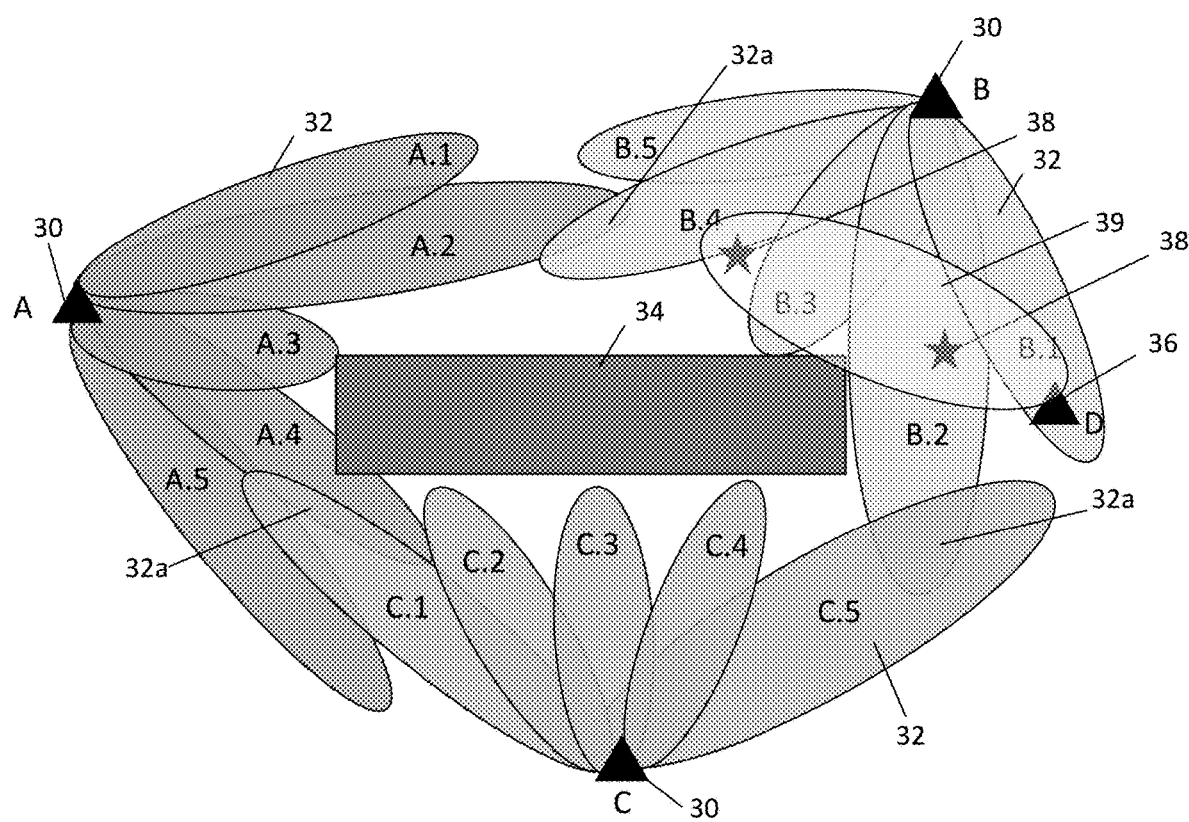
Figure 7:
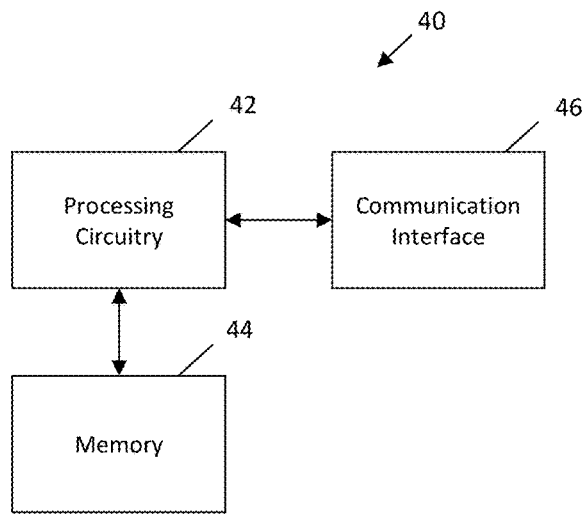
Figure 8:
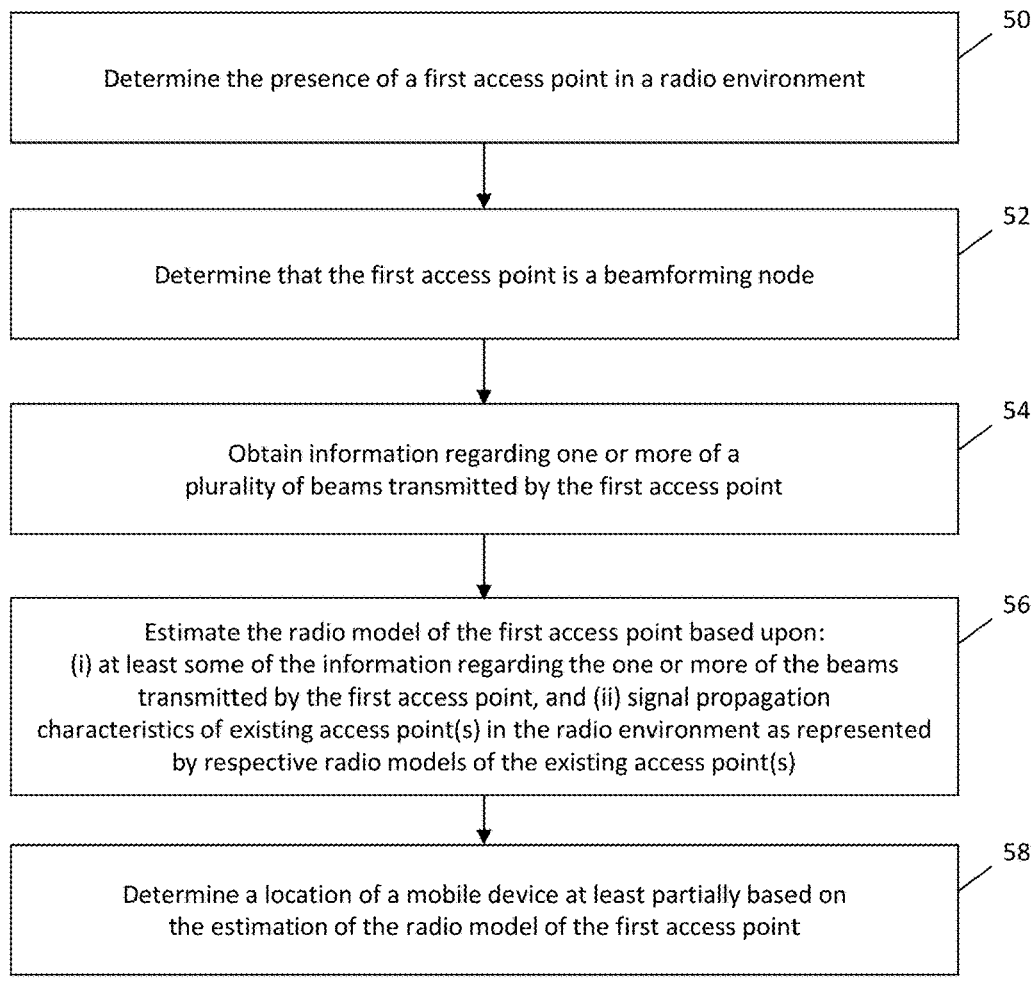
Figure 9:
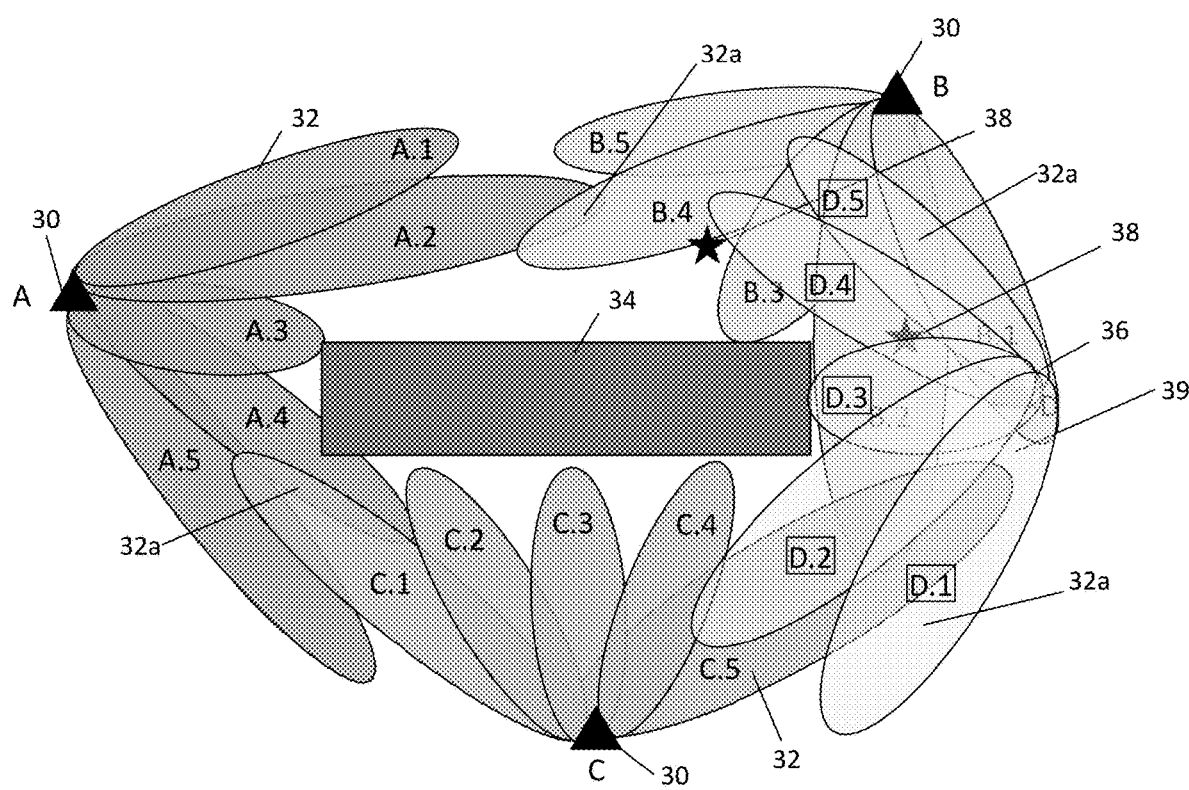
Figure 10:
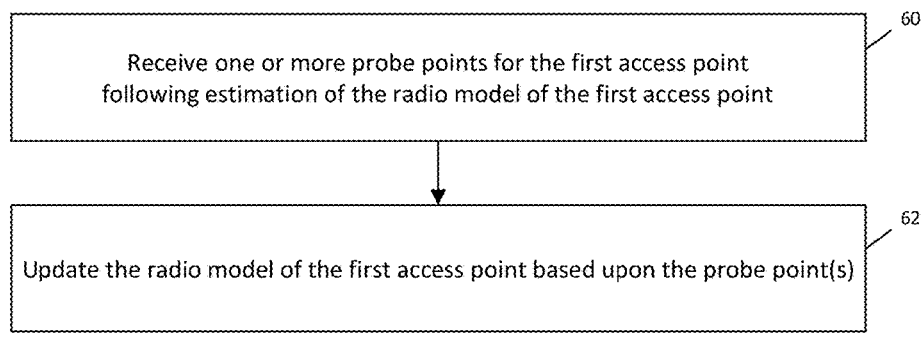
Figure 11:
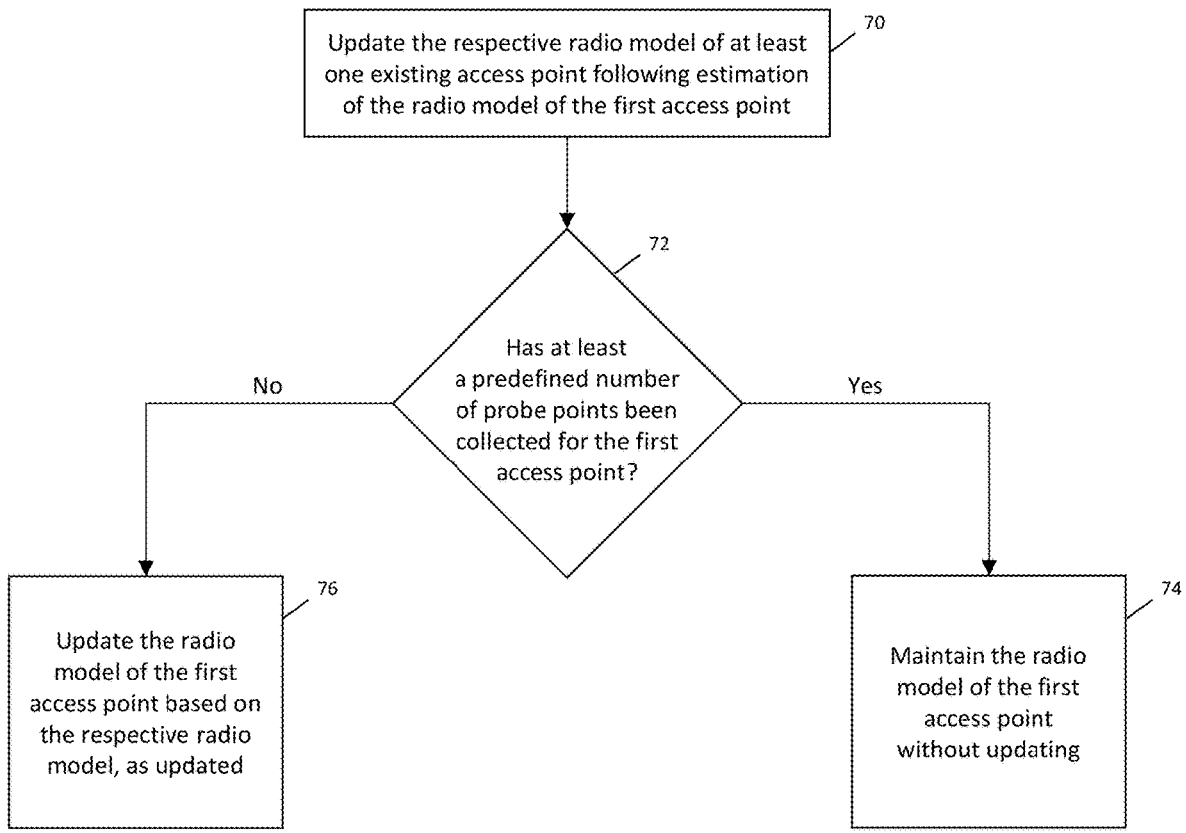

Having thus described certain embodiments of the present disclosure in general terms, reference will now be made to the accompanying drawings, which are not necessarily drawn to scale, and wherein:

FIG. 1 illustrates a fixed coverage model of a wireless communication node;

FIGS. 2A and 2B illustrate the coverage models of a beamforming node at two different points in time;

FIG. 3A illustrates eight different beams of radio signals that are sequentially transmitted at different points in time by a beamforming access point;

FIG. 3B is a graphical representation of the signal strength of the radio signals that are received and measured by a mobile device located relative to the beamforming access point as shown in FIG. 3A as the different beams are sequentially transmitted by the beamforming node as indicated along the horizontal axis of FIG. 3B;

FIG. 4 illustrates a radio environment having three access points and associated radio models that are shaped, at least in part, based upon an obstacle within the radio environment;

FIG. 5 also illustrates the radio environment of FIG. 4 following the introduction of a new access point;

FIG. 6 illustrates the radio environment of FIG. 5 and depicts an initial radio model of the new access point as defined based upon two probe points;

FIG. 7 is a block diagram of an apparatus that may be specifically configured in accordance with an example embodiment in order to accelerate the estimation of the radio model of a beamforming access point;

FIG. 8 is a flow chart illustrating the operations performed, such as by the apparatus of FIG. 7, in accordance with an example embodiment;

FIG. 9 illustrates the radio environment of FIG. 5 following the addition of the radio model that has been estimated for the new beamforming access point in accordance with an example embodiment;

FIG. 10 is a flow chart illustrating the operations performed, such as by the apparatus of FIG. 7, in order to update the radio model of a new beamforming access point following the receipt of one or more additional probe points in accordance with an example embodiment; and FIG. 11 is a flow chart illustrating the operations performed, such as by the apparatus to FIG. 7, in order to determine in accordance with an example embodiment whether to update the radio model of a new beamforming access point following the updating of a respective radio model of an existing access point.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment in order to accelerate the estimation of the radio model of a beamforming access point within a radio environment. As described below, the beamforming access point is configured to transmit radio signals having a variable or dynamic coverage model that changes over time such that the radio model that is estimated is correspondingly reflective of the variable or dynamic coverage model. The beamforming access point may be any of a variety of different types of access points including an access point, Node B, enhanced Node B (eNB) or the like, such as for a cellular system, e.g., a 5G cellular system, or a non-cellular network, e.g., an 802.11 WiFi network.

By way of example, FIG. 3A depicts a beamforming access point 20 having a phased array of antennas for transmitting and receiving radio signals. The radio beams 22 sequentially generated by the beamforming access point at eight different points in time are illustrated and designated 1, 2, . . . 8. In FIG. 3A, all eight beams are depicted in a composite view. However, the beamforming access point of one embodiment will only transmit one (or a subset) of the beams at any one point in time, while the beamforming access point of another embodiment will preferentially transmit only one (or a subset) of the beams such that the preferred one (or subset) of the beams has a greater power than signals transmitted by the other beams. In either embodiment, the beamforming access point sweeps the beam by sequentially advancing from transmission of one beam to the next until all of the beams have been transmitted, or preferentially transmitted, in a relatively short period of time while the position of the beamforming access point remains the same or virtually the same. As shown, the beamforming access point sweeps the beam such that the beam of radio signals generated at each different point in time is different from the beams of radio signals generated at other points in time, at least in terms of the direction and corresponding coverage area of the beams of radio signals.

For a mobile device 24 positioned relative to the beamforming access point 20 as shown in FIG. 3A, the signal strength of the radio signals transmitted by the beamforming access point and received by the mobile node at each of the eight different sequential points in time when the eight different beams of radio signals are transmitted by the beamforming access point are graphically depicted in FIG. 3B. The mobile device may include any of a wide variety of mobile terminals such as a mobile telephone, a smart phone, a personal digital assistant (PDA), a personal navigation device, a smart watch, a tablet computer, or any combination of the aforementioned and other types of portable computer devices. With respect to a beamforming access point, the radio signals received by the mobile node not only identify the beamforming access point, but may also identify the antenna configuration that is currently active such that the different beams may be distinguished. As shown in FIG. 3B, the signal strength from the third beam of radio signals is greater than the signal strengths of any of the other beams of radio signals generated by the same beamforming access point since the position of the mobile device is more closely aligned with the third beam of radio signals as shown in FIG. 3A.

The access point for which the radio model is estimated may be a beamforming access point that is newly added to the radio environment, that is, a beamforming access point that was not previously present within the radio environment and was not previously transmitting radio signals throughout the radio environment. Alternatively, the access point for which the radio model is estimated may be a beamforming access point that was previously part of the radio environment, such as by being previously present within the radio environment and transmitting radio signals throughout the radio environment, but that has been moved or relocated within the radio environment.

The beamforming access point for which the radio model is estimated may be an access point for a cellular-based radio environment, such as a base station, or for a non-cellular radio environment, such as a WLAN access point or other type of non-cellular access point. Additionally, the beamforming access point for which the radio model is estimated and the radio environment in which the access point is disposed may be outdoors, such as in an instance in which the access point is a base station of a cellular-based radio environment, or indoors, such as in an instance in which the access point is a WLAN access point or other type of non-cellular access point. By way of example, but not of limitation, the method, apparatus and computer program product of an example embodiment will hereinafter be described in conjunction with a radio environment that is indoors with the beamforming access point for which the radio model is estimated also being indoors, such as a WLAN access point or other non-cellular access point.

The radio environment into which the beamforming access point is added or within which the beamforming access point is relocated also includes one or more existing access points that are configured to transmit radio signals throughout the radio environment and for which radio models have been defined. The existing access point(s) may also be beamforming access point(s) or may be access point(s) having a static coverage model or may be some combination thereof. The access point for which a radio model is estimated in accordance with an example embodiment is added to the radio environment or is moved within the radio environment after the radio models of the existing access points have been defined, such as based on probe points collected for the existing access points. The access point for which a radio model is estimated and the existing access points may be the same type of access points, such as base stations or other cellular-based access points or a WLAN access point or other non-cellular access points.

By way of example, FIG. 4 depicts a radio environment that includes three existing access points 30 designated A, B and C. A radio model 32 has been defined for each of the existing access points. The radio models of the existing access points illustrate the region within which radio signals transmitted by a respective access point can be detected with at least predefined signal characteristics, such as at least a predefined signal strength. Outside of the region defined by the radio model for a respective access point, the radio signals transmitted by the respective access point are either not detected or, if detected, have signal characteristics that fail to satisfy the predefined signal characteristics, such as by having a signal strength that is less than a predefined threshold. Although one or more of the access points may have a static radio model, the access points of FIG. 4 are beamforming access points having a dynamic radio model that changes over time as beams are sequentially generated by different antennas of the access point. Indeed, the beamforming access points are each shown to sequentially generate five beams designated X.1, X.2, X.3, X.4 and X.5 with X designating the particular access point, e.g., A, B or C, and the numerical designation indicating the particular beam. For example, the beamforming access point designated A is configured to initially transmit the beam designated A.1 followed sequentially by A.2, A.3, A.4 and then A.5. Thus, while FIG. 4 depicts all of the beams transmitted by a respective access point over time, the beamforming access point of an example embodiment only transmits one of the beams at any particular point in time. In other embodiments, the beamforming access point may transmit multiple beams, such as two, three or even all of the beams, at one time with the beams being distinguished by a respective beam identifier. As shown, each beam points in a different direction. Also, while the beamforming access points of FIG. 4 are each shown to transmit five beams, the beamforming access points of other embodiments may be configured to transmit a greater or lesser number of beams and/or to transmit a different number of beams than the other beamforming access points.

While the radio models 32 may be defined for the existing access points 30 in various manners, the radio models for the existing access points may be defined, in one embodiment, based upon probe points that have been collected, such as by mobile devices within the radio environment, from the existing access points. As noted above, a mobile device may include any of a wide variety of mobile terminals such as a mobile telephone, a smart phone, a PDA, a personal navigation device, a smart watch, a tablet computer, or any combination of the aforementioned and other types of portable computer devices.

The radio environment of the illustrated embodiment includes an obstacle 34 that prevents or limits the otherwise uniform propagation of the radio signals transmitted by the existing access points 30 throughout the radio environment. The radio environment may include various types of obstacles that limit or otherwise alter the signal propagation of the radio signals transmitted by the existing access points. In an indoor setting, the obstacle may be a wall, a bank of elevators or other physical structures that prevent or limit the propagation of radio signals transmitted by the existing access points throughout the radio environment. In an outdoor setting, however, the obstacle may be any type of structure or other impediment to signal propagation throughout the radio environment. For example, while a wall or other physical structure may also serve as an obstacle within the outdoor setting, urban canyons may also serve as an obstacle by limiting the propagation of radio signals throughout the radio environment. While obstacles in the form of physical structures have been described by way of example, there may be other types of obstacles to the uniform propagation of radio signals, including sources of magnetic and/or electromagnetic signals that may interfere with the propagation of radio signals throughout the radio environment. Further details regarding obstacles, the interaction of radio signals therewith and the resulting estimation of a radio model in the vicinity of an obstacle are described by U.S. patent application Ser. No. 17/082,887, filed Oct. 28, 2020, the entire contents of which are incorporated herein by reference.

Referring now to FIG. 4, the radio models 32 of the existing access points 30 are shaped based at least in part upon the impediment to signal propagation introduced by the obstacle 34. For example, the radio model associated with the existing access point designated A has a generally C-shape with the beams designated A.1, A.2, A.4 and A.5 extending further and at least partially about opposite sides of the obstacle relative to the beam designated A.3, which is truncated by the obstacle. The radio models of the other existing access points designated B and C are similarly shaped based at least in part upon the impediment to signal propagation introduced by the obstacle with the radio beams B.1, B.2, B.4 and B.5 extending further than radio beam B.3 and the radio beams C.1, C.2, C.4 and C.5 extending further than radio beam C.3 as a result of the obstacle.

As shown in FIG. 4, one or more beams of the radio models 32 of the existing access points 30 may partially overlap with regions designated 32a. By utilizing the radio models of the existing access points, the location of a mobile device may be determined, such as based upon a radio coverage model. In this regard, a radio device that receives radio signals from the beams designated A.4 and C.1 may be determined to be within the region in which the radio models of access point A and access point C overlap.

As shown in FIG. 5, another access point 36, namely, a beamforming access point, designated as D may be detected within the radio environment. In this regard, the other access point may be a new access point that was not previously located within the radio environment and, as such, did not previously transmit radio signals throughout the radio environment. Alternatively, the other access point that is now detected may have been one of the existing access points that has moved or been relocated and, as a result, now has a different radio model associated therewith since the radio signals are being transmitted from a different location within the radio environment. By way of example, FIG. 5 depicts a scenario in which another access point that is new to the radio environment is detected. In the illustrated embodiment, the access point that is new to the radio environment is detected by the collection of probe points 38, such as by a mobile device, with the probe points providing information regarding the radio signals transmitted by the new access point within the radio environment. Since the probe points that are collected are representative of radio signals transmitted by an access point that was not previously in the radio environment, the presence of a new and different access point is detected.

As shown in FIG. 6, a radio model 39 may be generated for the access point 36 that is new to the radio environment or that has been repositioned within the radio environment based upon the probe points 38 that have been collected for the access point. For a period of time following the initial introduction of the new access point, however, only a few probe points may have been collected for the new access point, such as the two probe points depicted in FIG. 5. Although a radio model may be constructed based upon the relatively few number of probe points, such as the radio model constructed based upon the two probe point for the new access point depicted in FIG. 6, the radio model and, in particular, the size, shape and other characteristics of the radio model may be less accurate than is desired due to the limited amount of data, such as the limited number of probe points, upon which the radio model is based. With respect to the example of FIG. 6, the radio model that is constructed based upon the two probe points that have been collected for the new access point designated as access point D has an elliptical shape that extends to a limited degree on one side of the obstacle 14. This radio model is likely inaccurate, however, as additional probe points have not yet been collected from other locations relative to the obstacle, such as from locations on the other side of the obstacle, or from other locations further removed from the new access point, and/or from other beams of the beamforming access point.

Based upon the resulting inaccuracies or other limitations of the radio model 39 that may be constructed based upon the limited number of probe points 38 that have been collected, subsequent use of the resulting radio model for the new access point 36 may correspondingly be inaccurate or imprecise. For example, the determination of the position of a mobile device based at least partly upon the radio model for a new access point that has been constructed based upon a limited number of probe points, such as shown in FIG. 6, may also be inaccurate or imprecise due to the limitations imposed upon the radio model for the new access point. These inaccuracies and the lack of precision may be particularly prevalent in an instance in which the new access point is a beamforming access point having a dynamic radio model attributable to the manner in which the beam is swept through space.

In order to increase the accuracy of a resulting radio model 39 that is estimated for a new beamforming access point 36, such as a beamforming access point that has not previously been present within the radio environment or that has moved within the radio environment, and to accelerate the estimation of the radio model of the new beamforming access point, such as by estimating the radio model soon after the new beamforming access point has entered the radio environment, such as prior to the collection of a substantial number of probe points for the new beamforming access point, a method, apparatus and computer program product are provided. The apparatus that is configured to accelerate the estimation of the radio model for a new beamforming access point may be embodied by any of a variety of different types of computing devices, such as a positioning system, a server, a cloud computing device, a computer workstation, a distributed network of computing devices, a personal computer or any other type of computing device.

Regardless of the type of computing device that embodies the apparatus, the apparatus 40 of an example embodiment depicted in FIG. 7 includes, is associated with or is otherwise in communication with processing circuitry 42, memory 44 and communication interface 46. In some embodiments, the processing circuitry (and/or co-processors or any other processors assisting or otherwise associated with the processing circuitry) can be in communication with the memory via a bus for passing information among components of the apparatus. The memory can be non-transitory and can include, for example, one or more volatile and/or non-volatile memories. In other words, for example, the memory may be an electronic storage device (for example, a computer readable storage medium) comprising gates configured to store data (for example, bits) that can be retrievable by a machine (for example, a computing device like the processing circuitry). The memory can be configured to store information, data, content, applications, instructions, or the like for enabling the apparatus to carry out various functions in accordance with an example embodiment of the present disclosure. For example, the memory can be configured to buffer input data for processing by the processing circuitry. Additionally or alternatively, the memory can be configured to store instructions for execution by the processing circuitry.

The processing circuitry 42 can be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry can include one or more processing cores configured to perform independently. Additionally or alternatively, the processing circuitry can include one or more processors configured in tandem via the bus.

In an example embodiment, the processing circuitry 42 can be configured to execute instructions stored in the memory 44 or otherwise accessible to the processing circuitry. Alternatively or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, a mobile device, a server or other computing device of a positioning system or other network entity) configured to employ an embodiment of the present disclosure by further configuration of the processor by instructions for performing the algorithms and/or operations described herein. The processing circuitry can include, among other things, a clock, an arithmetic logic unit (ALU) and/or one or more logic gates configured to support operation of the processing circuitry.

The apparatus 40 of an example embodiment can also include the communication interface 46 that can be any means such as a device or circuitry embodied in either hardware or a combination of hardware and software that is configured to receive and/or transmit data from/to other electronic devices in communication with the apparatus, such as a database which, in one embodiment, stores a radio map generated and/or employed by the processing circuitry 42. The communication interface may be configured to support communication, for example, between one or more mobile devices, a positioning system and/or one or more other network entities. In an embodiment in which the apparatus is embodied by a mobile device, the communication interface may also be configured to communicate in accordance with various wireless protocols including communication with one or more wireless communication nodes of a cellular system and/or a non-cellular system. The communication interface can include, for example, an antenna (or multiple antennas) and supporting hardware and/or software for enabling communications with a wireless communication network. In this regard, the communication interface can include, for example, an antenna (or multiple antennas) and supporting hardware and/or software for enabling communications with a wireless communication network. Additionally or alternatively, the communication interface can include the circuitry for interacting with the antenna(s) to cause transmission of signals via the antenna(s) or to handle receipt of signals received via the antenna(s). In some environments, the communication interface can alternatively or also support wired communication.

Referring now to FIG. 8, the operations performed, such as by the apparatus 40 of FIG. 7, in accordance with an example embodiment are depicted. As shown in block 50, the apparatus includes means, such as the processing circuitry 42, the communication interface 46 or the like, for determining the presence of a first access point in a radio environment. In this regard, the first access point is an access point that is new to the radio environment or that has relocated to a new position within the radio environment. The presence of the first access point may be determined in various manners. In an example embodiment, however, the presence of the first access point may be determined based on one or more probe points that are associated with the first access point. In this regard, the one or more probe points may be received, such as via the communication interface, and determined, such as by the processing circuitry, to be representative of radio signals transmitted by a respective beam of the first access point and detected by a mobile device within the radio environment.

With reference to the example depicted in FIG. 5, the probe points 38 representative of radio signals transmitted by the access point 36 designated D may identify the beamforming access point that transmitted the radio signals based upon an indication included or otherwise associated with the radio signals. As such, the radio signals may be utilized to determine the presence of a new access point to the radio environment, such as based upon a comparison of the identity of the access point that transmitted the radio signals to the existing access points that were previously determined to be in the radio environment. In this regard, the probe points may be associated with an access point that was not previously detected to be within the radio environment in the case of a new access point. Alternatively, the probe points may be detected by a mobile device to be within a portion of the radio environment that was outside of the radio model of an existing access point, such as in the case in which the access point that had been relocated within the radio environment.

As shown in block 52, the apparatus 40 also includes means, such as the processing circuitry 42 or the like, configured to determine that the first access point is a beamforming node. The first access point may be determined to be a beamforming node in various manners. For example, the apparatus, such as the processing circuitry, may be configured to determine that the first access point is a beamforming node by detecting that the first access point employs beam sweeping to alter signal strengths of the plurality of beams transmitted by the first access point over time. Additionally or alternatively, the radio signals that are received, such as by the communication interface 46, may include an indication that the first access point is a beamforming node. The indication may explicitly indicate that the first access point is a beamforming node, such as by providing a flag or other indicia that the first access point is a beamforming node, or the indication may be implicit, such as by providing information regarding the number of beams transmitted by the first access point and identifying the particular beam via which the radio signals are transmitted.

In another example embodiment, the apparatus 40, such as the processing circuitry 42, the communication interface 46 or the like, is configured to determine whether the first access point is a beamforming node by determining a measure, e.g., the received signal strength, of the signals received from first access point at each of a plurality of different points in time. As a result, the apparatus of this example embodiment may also include means, such as the processing circuitry, the communication interface or the like, for identifying, from the measure of the signals received from the first access point, that two or more different beams of radio signals are received, such as at different points in time, from the first access point that is identified as a beamforming node. In this regard, the apparatus, such as the processing circuitry, communication interface or the like, of this example embodiment is configured to measure the radio signals received from first access point at two or more different times and to identify, based upon the measurements at two or more different times, whether different beams of radio signals are received from the same access point, that is, the first access point. In an instance in which two or more different beams of radio signals are received from the first access point, the apparatus, such as the processing circuitry, is configured to identify the first access point as a beamforming node.

The apparatus 40, such as the processing circuitry 42, the communication interface 46 or the like, of an example embodiment may be configured to identify that two or more beams of radio signals that are received at different times from the first access point are different in an instance in which the measures of the different beams of radio signals vary by more than a predefined amount or by more than a predefined percentage. Thus, the apparatus, such as the processing circuitry, the communication interface or the like, of this example embodiment is configured to accommodate a small deviation in the beams of radio signals received from the first access point at different points in time without identifying the first access point as a beamforming node. Instead, the apparatus, such as the processing circuitry, the communication interface or the like, of this example embodiment is only configured to identify the first access point as a beamforming node in an instance in which the beams of radio signals received from the first access point at different points in time are more substantially different, such as by differing by more than the predefined amount or the predefined percentage. In other embodiments, however, the apparatus, such as the processing circuitry, the communication interface or the like, may be configured such that any difference in the beams of radio signals received from the first access point at different points in time may cause the first access point to be identified as a beamforming node.

As shown in block 54, the apparatus 40 also includes means, such as the processing circuitry 42, the communication interface 46 or the like, configured to obtain information regarding one or more of a plurality of beams of which the one or more probe points are representative. As noted above, the information regarding one or more of the plurality of beams, such as the beam via which the radio signals are transmitted, may include information identifying the respective beam and the total number of beams transmitted by the first access point. Additionally, the information regarding the one or more of the plurality of beams may include the signal propagation characteristics of the first access point. The signal propagation characteristics may include the presence (or absence) of signals transmitted by a respective access point that have at least a predefined signal strength at one or more locations. Alternatively, the signal propagation characteristics may include the signal strength of the signals transmitted by the respective beam of the beamforming access point at one or more locations. In other embodiments, the information that is obtained may relate to additional or different signal propagation characteristics, at least some of which are associated with one or more locations within the radio environment.

As shown in block 56, the apparatus 40 also includes means, such as the processing circuitry 42 or the like, configured to estimate the radio model of the first access point 36 based at least upon: (i) at least some of the information regarding the one or more of the beams transmitted by the first access point and (ii) signal propagation characteristics of one or more existing access points in the radio environment as represented by respective radio models of the one or more existing access points. As described above, the information regarding a beam transmitted by the first access point may include information identifying the beam and, in some embodiments, the total number of beams transmitted by the first access point. The information may also include signal propagation characteristics of the first access point, such as the presence (or absence) of signals transmitted by the respective beam of the first access point that have at least a predefined signal strength at one or more locations and/or the signal strength of the signals transmitted by the respective beam of the first access point at one or more locations.

The signal propagation characteristics of the one or more existing access points 30 may be represented by respective radio models 32 which define the presence (or absence) of signals transmitted by respective beams of the existing access points that have at least a predefined signal strength at one or more locations and/or the signal strength of the signals transmitted by the respective beams of the existing access points at one or more locations. With respect to the example described above, the radio model 38 of the new beamforming access point 36 designated D may be estimated based upon the signal propagation characteristics of the existing access points designated A, B and C within the radio environment, such as depicted in FIG. 9. In this regard, the radio model 39 of the new beamforming access point of FIG. 9 is much more comparable to the radio models of the existing access points in the same radio environment than the radio model that would otherwise be constructed based upon a limited number of initial probe points 38, such as described above and shown in FIG. 6. As such, the radio model that is estimated for the new beamforming access point in accordance with an example embodiment can more accurately represent the signal propagation characteristics of the radio signals transmitted by the new access point. Additionally, the radio model of the new beamforming access point may be estimated in accordance with an example embodiment relatively soon after having determined in the presence of the new access point without awaiting the collection of a more substantial number of probe points from the new access point.

The apparatus 40, such as the processing circuitry 42, may be configured to estimate the radio model of the first access point 36 in various manners. In an example embodiment, the estimation of the radio model of the first access point includes orienting the radio model of the first access point, such as by orienting the beam that transmits the radio signals that have been received, such as a first probe point, relative to the other beams of the first access point. The radio model may be oriented in various manners, but, in one embodiment, the apparatus, such as the processing circuitry, is configured to orient the radio model based at least in part upon the identification of the respective beam of the first access point in relation to the total number of beams of the first access point. For example, in an instance in a first probe point is representative of the third beam, e.g., D.3, of the first access point, which has five total beams, the apparatus, such as the processing circuitry, may be oriented such that two beams are positioned on each of the opposite sides of the third beam.

In another example embodiment, the apparatus 40, such as the processing circuitry 42, is configured to orient the radio model 39 based upon one or more other probe points representative of radio signals transmitted by other beam(s) of the first access point 36. In this example embodiment, the apparatus includes means, such as the processing circuitry, the communication interface 46 or the like, for receiving information regarding a second probe point representative of radio signals transmitted by another beam of the plurality of beams transmitted by the first access point. The apparatus also includes means, such as the processing circuitry, configured to estimate the radio model of the first access point by orienting the radio model of the first access point based at least in part upon relative positions of the respective beam of which the first probe point is representative and the another beam of which the second probe point is representative in relation to the total number of beams of the first access point. For example, in an embodiment in which the first and second probe points are representative of the third and fourth beams, respectively, and the first access point transmits five beams in total, the radio model may be estimated to have two beams on one side of the beam of which the first probe point is representative and one beam on the opposite side of the beam of which the second probe point is representative.

In an example embodiment, the apparatus 40, such as the processing circuitry 42, is additionally or alternatively configured to estimate the radio model 39 of the first access point 36 based upon the size and/or the shape of the respective radio models 32 of the existing access points 30. In this regard, the apparatus, such as the processing circuitry, is configured to estimate the size of the radio model of the beams of the first access point to be the same or to be approximately equal to the size of the corresponding beams of the radio models of the existing access points. Additionally or alternatively, the apparatus, such as the processing circuitry, is configured to estimate the shape of the radio model of the beams of the first access point to have the same or a similar shape as the shape of the radio models of the beams of the existing access points. For example, the relative size and shape of the radio model of the beams of the first access point may be the same as or may correspond to the size and shape of the radio models of the existing access points, such as the size and shape of the radio models of the beams of the existing access points in an instance in which the existing access points are also beamforming.

Although first and second probe points may be representative of radio signals transmitted by different beams of the first access point 36 as described above, the first and second probe points may, instead, both be representative of the radio signals transmitted by the same respective beam of the first access point. In this example embodiment, the first and second probe points are associated with different respective locations and provide information regarding a signal strength of the radio signals transmitted in the respective beam of the first access point and received at the respective location. As such, the apparatus 40, such as the processing circuitry 42, of this example embodiment is configured to estimate the radio model 39 of the first access point based at least in part upon the signal strength of the radio signals represented by the first probe point and the signal strength of the radio signals represented by the second probe point. As such, the detection of multiple probe points representative of the same beam of a first access point may permit the radio model of the respective beam to be estimated with enhanced accuracy.

In an instance in which an obstacle 34 is located within the radio environment, the apparatus 40, such as the processing circuitry 42, of an example embodiment is configured to estimate the radio model 39 of the first access point 36 based upon at least the shape of the respective radio models 32 of the existing access points 30 relative to the obstacle. In this regard, the apparatus, such as the processing circuitry, is configured to estimate the shape of the radio model of the beams of the first access point to have the same or similar shape relative to the obstacle within the radio environment as the shape that the respective radio models of the existing access points have relative to the obstacle. With respect to the example of FIG. 9, the generally C-shape of the radio models of the existing access points that extend at least partly about opposite sides of the obstacle may be utilized by the apparatus, such as the processing circuitry, of an example embodiment to estimate the shape of the radio model of the beams of the first access point to similarly have a C-shape with one or both of the outermost beams extending at least partly about the opposite sides of the obstacle with a more central beam being more truncated as a result of the impediment created by the obstacle.

In this example embodiment, the apparatus 40 may also include means, such as the processing circuitry 42 or the like, configured to determine the presence of the obstacle 34 and/or characteristics of the obstacle, such as the location, size and/or shape of the obstacle, based on signal propagation characteristics of respective radio models 32 of the one or more existing access points 30. As such, the apparatus, such as the processing circuitry, of this example embodiment is configured to estimate the radio model 39 of the first access point 36 based upon signal propagation characteristics of one or more existing access points by estimating the radio model of the first access point based on the determined presence of the obstacle and/or characteristics of the obstacle.

In an instance in which the radio environment includes a plurality of existing access points 30 having respective radio models 32, the radio model of each of the existing access points may be considered equally in relation to the estimation of the radio model 39 of the first access point 36 that is newly present or newly located within the radio environment. However, in some example embodiments, the apparatus 40 includes means, such as the processing circuitry 42 or the like, configured to differently weight the contributions of the respective radio models of the one or more existing access points to the estimation of the radio model of the first access point based upon one or more weighting factors. In one example embodiment, the weighting factors are based on whether the existing access points are beamforming access points or static access points that have a constant radio model that does not materially change over time. In this example embodiment, an existing access point may be weighted more greatly in an instance in which the existing access point is a beamforming access point, like the first access point. In contrast, an existing access point may be weighted more lightly in an instance in which the existing access point is a static access point having a constant radio model. Thus, the radio model of an existing beamforming access point will have a greater contribution to the estimation of the radio model of the first access point than the radio model of an existing static access point that has a constant radio model.

In another example embodiment, the weighting factors additionally or alternatively include the confidence associated with the radio models 32 of the existing access points 30. In this regard, the contribution of a respective radio model of an existing access point to the estimation of the radio model 39 of the first access point 36 may be weighted in a manner that has a direct relationship, such as a proportional relationship, to the confidence associated with the respective radio model of existing access point. In this example embodiment, the confidence associated with the radio models of the existing access points may be based upon the number of probe points that have been collected for the existing access points which, in turn, is evidence of the relative reliability of the radio models. Thus, a weighting factor of this example embodiment includes the number of probe points that have been collected for respective ones of the existing access points. By way of example, the contribution of a respective radio model of an existing access point to the estimation of the radio model of the first access point may be weighted in a manner that has a direct relationship, such as a proportional relationship, to the number of probe points that have been collected for the respective existing access point. Thus, the contribution of the respective radio model of an existing access point is weighted more heavily in an instance in which a large number of probe points have been collected for the respective access point than in an instance in which only a few number of probe points have been collected for the existing access point. The radio model of an existing access point for which a large number of probe points have been collected will therefore have a greater contribution to the estimation of the radio model of the first access point than the radio model of an existing access point for which only a few probe points have been collected.

The confidence associated with the radio models 32 of the existing access points 30 may additionally or alternatively be based upon the freshness of the radio models as defined, for example, by the time elapsed since the probe points have been collected for respective ones of the existing access points. Thus, another weighting factor that may be considered in addition to, or instead of, the number of probe points have been collected for respective ones of the existing access points is the time elapsed since the probe points have been collected for respective ones of the existing access points. By way of example, the contribution of a respective radio model of an existing access point to the estimation of the radio model 39 of the first access point 36 may be weighted in a manner that has an indirect relationship, such as an inversely proportional relationship, to the time elapsed since the probe points have been collected for respective ones of the existing access points. Thus, the contribution of the respective radio model of an existing access point is weighted more heavily in an instance in which at least some of the probe points have been recently collected such that the time elapsed since the most recent probe points have been collected is relatively small than in an instance in which no probe points have been collected for a longer period of time such that the time elapsed since the most recent probe points have been collected is relatively large. The radio model of an existing access point for which probe points have been collected more recently will therefore have a greater contribution to the estimation of the radio model of the first access point than the radio model of an existing access point for which no probe points have been collected for a longer period of time.

Yet another weighting factor that may be considered in addition to or instead of the confidence associated with the radio models 32 of the existing access points 30 is the degree of similarity, e.g., homogeneity, between the respective radio models of the existing access points. In this regard, the degree of similarity is a measure of the similarity between the shapes and sizes of the respective radio models of the existing access points. By way of example, the contribution of a respective radio model of an existing access point to the estimation of the radio model 39 of the first access point 36 may be weighted in a manner that has an direct relationship, such as a proportional relationship, to the similarity that the respective radio model of the existing access point has to the respective radio models of one or more other existing access points. Thus, the contribution of the respective radio model of an existing access point is weighted more heavily in an instance in which the respective radio model of the existing access point is similar in size and/or shape to the respective radio model(s) of one or more other existing access points than in an instance in which the respective radio model of the existing access point is dissimilar in both size and shape to the respective radio model(s) of all of the other existing access points. The radio model of an existing access point that is similar in size and/or shape to the respective radio model(s) of one or more other existing access points will therefore have a greater contribution to the estimation of the radio model of the first access point than the radio model of an existing access point that is dissimilar in size and shape to the radio models of all of the other existing access points.

In this example embodiment, the weighting may be further dependent upon the number of radio models 32 of the existing access points 30 that are similar in size and/or shape and/or the degree of similarity between the radio models of the existing access points. In this regard, the weighting may have a direct relationship, such as a proportional relationship, to the number of radio models of the existing access points that are similar in size and/or shape. Similarly, the weighting may have a direct relationship, such as a proportional relationship, to the degree of similarity between the radio models of the existing access points. The radio model of an existing access point that is similar in size and/or shape to the respective radio models of a larger number of other existing access points will therefore have a greater contribution to the estimation of the radio model 39 of the first access point 36 than the radio model of an existing access point that is similar in size and/or shape to the respective radio models of a smaller number of other existing access points. Also, the radio model of an existing access point that is more similar in size and/or shape to the respective radio model of another one of the other existing access points will additionally have a greater contribution to the estimation of the radio model of the first access point than the radio model of an existing access point that is less similar in size and/or shape to the respective radio models of the other existing access points.

An additional or alternative weighting factor may be the relative positions of the first access point 36 and the one or more existing access points 30 to an obstacle 34 to signal propagation within a radio environment, such as the relative positions with respect to a particular feature of the obstacle. In this example embodiment, the apparatus 40 includes means, such as the processing circuitry 42 or the like, configured to weight contributions of the respective radio models 32 of the one or more existing access points to the estimation of the radio model 39 of the first access point based upon the relative positions of the first access point and the one or more existing access points to the obstacle to signal propagation within the radio environment. In an instance in which the relative positions of the first access point and an existing access point are the same with respect to the obstacle, the apparatus, such as the processing circuitry, of this example embodiment is configured to more greatly weight the contribution of the respective radio model of the existing access point that has the same or a similar relative position to the obstacle to the estimation of the radio model of the first access point. In contrast, in an instance in which the relative positions of the first access point and an existing access point are different with respect to the obstacle, the apparatus, such as the processing circuitry, of this example embodiment is configured to give less weight to the contribution of the respective radio model of the existing access point that has a different relative position to the obstacle to the estimation of the radio model of the first access point. Thus, the weight given to the contribution of a respective radio model of an existing access point to the estimation of the radio model of the first access point may have a direct relationship, such as a proportional relationship, to positional similarity between the existing access point and the first access point relative to an obstacle within the radio environment.

With respect to the example of FIG. 9, a first access point 36 designated D has the same or a similar position with respect to the obstacle 34 as the existing access point 30 designated A. In this regard, the access points designated A and D are both positioned in general alignment with the longer dimension of the obstacle, such as by being positioned approximate the shorter sides of the obstacle, while the other existing access points designated B and C and have different relative positions with respect to the obstacle. As such, the radio model 32 of the existing access point designated A in this example embodiment may be weighted so as to contribute more greatly to the shape and size of the radio model 39 of the first access point 36 designated D than the radio models of the existing access points designated B and C. In this example embodiment, the apparatus 40, such as the processing circuitry 42, is configured to weight the contributions of the respective radio models of the one or more existing access points to the estimation of the radio model of the first access point based upon the information regarding respective positions of the first access point and then one or more existing access points as well as information regarding the position and orientation of the obstacle to signal propagation within the environment.

The resulting radio model 39 of the first access point 36, that is, the access point that is new to the radio environment or the access point that has been repositioned within the radio environment, may be utilized for a variety of different purposes. In one embodiment, however, the determination that the first access point is a beamforming access point may permit the use of the beamforming access point to be restricted at least for certain purposes, such as by restricting the use of the beamforming access point for positioning purposes relative to other access points that are not identified to be beamforming in order to increase the accuracy and/or confidence with which the position of a mobile device is determined. Further details regarding restriction the use of a beamforming access point is described, for example, by U.S. patent application Ser. No. 17/116,798 filed Dec. 9, 2020, the entire contents of which are incorporated herein by reference.

However, as the radio model 39 of the beamforming access point 36 is at least partially estimated based upon the radio model(s) 32 of one or more existing radio models 30, the radio model of the first access point may be estimated with more accuracy and, as such, may be utilized in combination with the radio models of the existing access points in other embodiments in order to determine the position of a mobile device within the radio environment, such as based upon the radio signals from the different access points that are received by the mobile device relative to the different radio models of the access points. In this regard, the position of the mobile device may be determined to be within a region in which the radio models that encompass the region correspond to the access points transmitting the radio signals that are received by the mobile device. In this example embodiment, the apparatus 40 optionally includes means, such as the processing circuitry 42 or the like, configured to determine the location of the mobile device at least partially based upon an estimation of the radio model of the first access point. See block 58 of FIG. 8. In this regard, the apparatus, such as the processing circuitry, may also be configured in some, but not all embodiments, to determine the location of the mobile device based upon the respective radio models of the one or more existing access points in addition to the estimation of the radio model of the first access point.

In an example embodiment, the contribution of the estimated radio model 39 of the first access point 36 may be weighted relative to the contributions of the respective radio models 32 of the existing access points 30 to the determination of the location of the mobile device based upon the number of probe points that have been collected for the first access point. In this regard, the apparatus 40, such as the processing circuitry 42, may be configured to weight the contribution of the estimated radio model of the first access point to the determination of the location of the mobile device in a manner that is directly dependent upon, such as by being proportional to, the number of probe points that have been collected for the first access point. Thus, in an instance in which only a few probe points have been collected for the first access point, the apparatus, such as the processing circuitry, may be configured to correspondingly apply a small weight to the contribution of the estimation of the radio model of the first access point to the determination of the position of a mobile device relative to the contributions of the radio models of the exiting access points since the estimation of the radio model of the first access point is based upon a smaller amount of real data. In contrast, the contribution of the estimation of the radio model of the first access point for which a larger number of probe points have been collected may be more greatly weighted in regard to the determination of the position of a mobile device relative to the contributions of the radio models of the exiting access points. In an example embodiment, the estimation of the radio model of the first access point for which at least a predefined number of access points have been collected may be equally weighted in regards to the determination of the location of the mobile device with the contributions of the radio models of the existing access points.

Once the radio model 39 of the first access point 36 has been initially estimated, the radio model of the first access point may again be estimated, such as by updating the initial estimate, as one or more additional probe points are subsequently collected for the first access point. As shown in block 60 of FIG. 10, the apparatus 40 of this example embodiment includes means, such as the processing circuitry 42, the communication interface 46 or the like, configured to receive one or more probe points for the first access point following estimation of the radio model of the first access point. As noted above, these probe points may be representative of information collected by a mobile device within the radio environment based upon radio signals transmitted by the first access point and received by the mobile device, including, for example, an indication of the beam of the first access point that has transmitted the radio signals.

As shown in block 62 of FIG. 10, the apparatus 40 of this example embodiment may also include means, such as the processing circuitry 42 or the like, configured to update the radio model 39 of the first access point 36 based upon the one or more probe points. Thus, in an instance in which a probe point is collected for the first access point that is outside of the radio model that has been estimated for the first access point, the apparatus, such as the processing circuitry, may be configured to update the radio model so as to now include the region in which the probe point is located. As such, the accuracy of the radio model of the first access point may improve as one or more additional probe points are collected based upon radio signals transmitted by the first access point.

As shown in FIG. 11, the radio model 39 of the first access point 36 that has been estimated may also be updated based upon changes to, that is, updates to, the radio model 32 of an existing access point 30. As shown in block 70 of FIG. 11, the apparatus 40 of this embodiment includes means, such as the processing circuitry 42 or the like, configured to update the respective radio model of at least one of the one or more existing access points following estimation of the radio model of the first access point. The radio model of an existing access point may be updated for any of a variety of reasons including, for example, the collection of one or more additional probe points for the existing access point that lie outside of and cause updating of the respective radio model of the existing access point.

The apparatus 40 of this example embodiment also includes means, such as the processing circuitry 42 or the like, configured to determine whether to update the radio model 39 of the first access point 36 based upon an updated version of the respective radio model 32 of at least one of the one or more existing access points 30. In an example embodiment, the apparatus, such as the processing circuitry, is configured to determine whether to update the radio model of the first access point based upon the number of probe points that have been collected for the first access point. In this regard, in an instance in which fewer probe points have been collected for the first access point, the apparatus, such as the processing circuitry, will be more likely to update the radio model of first access point based upon updates to the radio model of an existing access point. Conversely, in an instance in which a larger number of probe points have been collected for the first access point, the apparatus, such as the processing circuitry, will be less likely to update the radio model of first access point based upon updates to the radio model of an existing access point.

In the illustrated embodiment and as shown in decision block 72 of FIG. 11, the apparatus 40, such as the processing circuitry 42, is configured to determine whether at least a predefined number of probe points have been collected for the first access point 36. In an instance in which at least the predetermined number of probe points have been collected for the first access point, the radio model 39 of the first access point is not modified or updated so as to take into account any update of the respective radio model 12 of at least one of the one or more existing access points 10. Thus, the apparatus of this example embodiment includes means, such as the processing circuitry, configured to maintain the radio model of the first access point without updating, as shown in block 74. Conversely, in an instance in which the number of probe points that have been collected for the first access point is less than the predetermined number of probe points, the apparatus, such as the processing circuitry, of this example embodiment is configured to update the radio model of the first access point based upon the respective radio model, as updated, of an existing access point. See block 66 of FIG. 11. Consequently, the accuracy of the radio model of the first access point may be enhanced based upon an update to the radio model of an existing access point in an instance in which only a few probe points have been collected for the first access point, such as less than the predetermined number of probe points. However, in an instance in which a larger number of probe points have been collected for the first access point, such as at least the predetermined number of probe points, the radio model for the first access point may not be updated, thereby conserving computing resources in this instance since the accuracy of the radio model of the first access point is likely greater based upon the larger number of probe points that have been utilized to define the radio model.

As described, a method, apparatus 40 and computer program product are provided in order to accelerate the estimation of the radio model 39 of a beamforming access point 36 within a radio environment, such as a beamforming access point that has been newly added to the radio environment or a beamforming access point that is been moved or relocated within the radio environment. By utilizing the radio models 32 of other existing access points 30 within the radio environment for purposes of estimating the radio model of the beamforming access point that has been newly added to or has been relocated within the radio environment, the radio model that is estimated in accordance with an example embodiment may not only be more quickly defined, but may be defined with enhanced accuracy relative to radio models that are defined on the basis of only a few probe points 38. Thus, the radio model that is estimated by the method, apparatus and computer program product of an example embodiment may be utilized to reliably determine the position of a mobile terminal within the radio environment.

FIGS. 8, 10 and 11 illustrate flowcharts depicting methods according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 24 of an apparatus 40 employing an embodiment of the present invention and executed by the processing circuitry 42. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for accelerating estimation of a radio model of a first access point, the method comprising:

determining a presence of the first access point in a radio environment;

determining that the first access point is a beamforming node and obtaining information regarding one or more of a plurality of beams, wherein the plurality of beams are transmitted by the first access point; and estimating the radio model of the first access point based at least upon: (i) at least some of the information regarding the one or more of the beams transmitted by the first access point, (ii) signal propagation characteristics of one or more existing access points in the radio environment as represented by respective radio models of the one or more existing access points and (iii) weighted contributions of the respective radio models of the one or more existing access points, wherein the weighted contributions are based upon one or more weighting factors, and wherein the one or more weighting factors include measurements of similarity between shapes and sizes of the respective radio models of the one or more existing access points.

2. A method according to claim 1, wherein determining the presence of the first access point comprises determining the presence of the first access point based at least upon a first probe point representative of radio signals transmitted by a respective beam from among the plurality of beams transmitted by the first access point, and wherein obtaining information regarding the one or more of the plurality of beams transmitted by the first access point comprises obtaining information regarding a total number of beams and an identification of the respective beam of the first access point providing the radio signals of which the first probe point is representative.

3. A method according to claim 2, wherein estimating the radio model of the first access point comprises orienting the radio model of the first access point based at least in part upon the identification of the respective beam of the first access point in relation to the total number of beams of the first access point.

4. A method according to claim 2, further comprising receiving information regarding a second probe point representative of radio signals transmitted by another beam of the plurality of beams transmitted by the first access point, and wherein estimating the radio model of the first access point comprises orienting the radio model of the first access point based at least in part upon relative positions of the respective beam and the another beam in relation to the total number of beams of the first access point.

5. A method according to claim 2, further comprising receiving information regarding a second probe point representative of the radio signals transmitted in the respective beam of the first access point, wherein the first and second probe points are associated with different respective locations and provide information regarding a signal strength of the radio signals transmitted in the respective beam of the first access point and received at the respective location, and wherein estimating the radio model of the first access point comprises estimating the radio model of the first access point based at least in part upon the signal strength of the radio signals represented by the first probe point and the signal strength of the radio signals represented by the second probe point.

6. A method according to claim 1, wherein estimating the radio model of the first access point comprises estimating the radio model of the first access point based upon at least a shape of the respective radio models of the one or more existing access points relative to an obstacle within the radio environment, wherein the obstacle comprises an obstacle to signal propagation within the radio environment.

7. A method according to claim 1, wherein determining that the first access point is a beamforming node comprises detecting that the first access point employs beam sweeping to alter signal strengths of the plurality of beams transmitted by the first access point over time.

8. A method according to claim 1, wherein the one or more weighting factors further include a confidence associated with the respective radio models of the one or more existing access points based on a number of probe points collected for the one or more existing access points in the radio environment.

9. A method according to claim 8, wherein the confidence associated with the respective radio models includes a measurement of time elapsed since one or more probe points of the number of probe points have been collected for the one or more existing access points in the radio environment.

10. An apparatus configured to accelerate estimation of a radio model of a first access point, the apparatus comprising processing circuitry and at least one memory including computer program code instructions, the computer program code instructions configured to, when executed by the processing circuitry, cause the apparatus to:
determine a presence of the first access point in a radio environment;
determine that the first access point is a beamforming node and obtain information regarding one or more of a plurality of beams, wherein the plurality of beams are transmitted by the first access point; and
estimate the radio model of the first access point based at least upon: (i) at least some of the information regarding the one or more of the beams transmitted by the first access point, (ii) signal propagation characteristics of one or more existing access points in the radio environment as represented by respective radio models of the one or more existing access points, and (iii) weighted contributions of the respective radio models of the one or more existing access points, wherein the weighted contributions are based upon one or more weighting factors, and wherein the one or more weighting factors include measurements of similarity between shapes and sizes of the respective radio models of the one or more existing access points.

11. An apparatus according to claim 10, wherein the computer program code instructions are configured to, when executed by the processing circuitry, cause the apparatus to determine the presence of the first access point by determining the presence of the first access point based at least upon a first probe point representative of radio signals transmitted by a respective beam of the plurality of beams transmitted by the first access point, and wherein the computer program code instructions are configured to, when executed by the processing circuitry, cause the apparatus to obtain information regarding the one or more of the plurality of beams transmitted by the first access point by obtaining information regarding a total number of beams and an identification of the respective beam of the first access point providing the radio signals of which the first probe point is representative.

12. An apparatus according to claim 11, wherein the computer program code instructions are configured to, when executed by the processing circuitry, cause the apparatus to estimate the radio model of the first access point by orienting the radio model of the first access point based at least in part upon the identification of the respective beam of the first access point in relation to the total number of beams of the first access point.

13. An apparatus according to claim 11, wherein the computer program code instructions are further configured to, when executed by the processing circuitry, cause the apparatus to receive information regarding a second probe point representative of radio signals transmitted by another beam of the plurality of beams transmitted by the first access point, and wherein the computer program code instructions are configured to, when executed by the processing circuitry, cause the apparatus to estimate the radio model of the first access point by orienting the radio model of the first access point based at least in part upon relative positions of the respective beam and the another beam in relation to the total number of beams of the first access point.

14. An apparatus according to claim 11, wherein the computer program code instructions are further configured to, when executed by the processing circuitry, cause the apparatus to receive information regarding a second probe point representative of the radio signals transmitted in the respective beam of the first access point, wherein the first and second probe points are associated with different respective locations and provide information regarding a signal strength of the radio signals transmitted in the respective beam of the first access point and received at the respective location, and wherein the computer program code instructions are configured to, when executed by the processing circuitry, cause the apparatus to estimate the radio model of the first access point by estimating the radio model of the first access point based at least in part upon the signal strength of the radio signals represented by the first probe point and the signal strength of the radio signals represented by the second probe point.

15. An apparatus according to claim 10, wherein the computer program code instructions are configured to, when executed by the processing circuitry, cause the apparatus to estimate the radio model of the first access point by estimating the radio model of the first access point based upon at least a shape of the respective radio models of the one or more existing access points relative to an obstacle within the radio environment, wherein the obstacle comprises an obstacle to signal propagation within the radio environment.

16. A method for accelerating estimation of a radio model of a beamforming access point, the method comprising:
following estimation of respective radio models of one or more existing access points within a radio environment, detecting that the beamforming access point has been added to or has been relocated within the radio environment;
obtaining information regarding one or more of a plurality of beams that have been transmitted by the beamforming access point; and
estimating the radio model of the beamforming access point based at least upon: (i) at least some of the information regarding one or more of the beams transmitted by the beamforming access point, (ii) signal propagation characteristics of the one or more existing access points in the radio environment, and (iii) weighted contributions of the respective radio models of the one or more existing access points, wherein the weighted contributions are based upon one or more weighting factors, and wherein the one or more weighting factors include measurements of similarity between shapes and sizes of the respective radio models of the one or more existing access points.

17. A method according to claim 16, wherein detecting that the beamforming access point has been added to or has been relocated within the radio environment is based at least upon a first probe point representative of radio signals transmitted by a respective beam of the plurality of beams transmitted by the beamforming access point, and wherein obtaining information regarding the one or more of the plurality of beams transmitted by the beamforming access point comprises obtaining information regarding a total number of beams and an identification of the respective beam of the beamforming access point providing the radio signals of which the first probe point is representative.

18. A method according to claim 17, wherein estimating the radio model of the beamforming access point comprises orienting the radio model of the beamforming access point based at least in part upon the identification of the respective beam of the beamforming access point in relation to the total number of beams of the beamforming access point.

19. A method according to claim 17, further comprising receiving information regarding a second probe point representative of radio signals transmitted by another beam of the plurality of beams transmitted by the beamforming access point, and wherein estimating the radio model of the beamforming access point comprises orienting the radio model of the beamforming access point based at least in part upon relative positions of the first and second probe points in relation to the total number of beams of the beamforming access point.

20. A method according to claim 17, further comprising receiving information regarding a second probe point representative of the radio signals transmitted in the respective beam of the beamforming access point, wherein the first and second probe points are associated with different respective locations and provide information regarding a signal strength of the radio signals transmitted in the respective beam of the beamforming access point and received at the respective location, and wherein estimating the radio model of the beamforming access point comprises estimating the radio model of the beamforming access point based at least in part upon the signal strength of the radio signals represented by the first probe point and the signal strength of the radio signals represented by the second probe point.

* * * * *